United States Patent [19]

Rothschild et al.

[11] Patent Number: 5,946,661
[45] Date of Patent: *Aug. 31, 1999

[54] METHOD AND APPARATUS FOR IDENTIFYING AND OBTAINING BOTTLENECK COST INFORMATION

[75] Inventors: Michael L. Rothschild, Greenbrae, Calif.; Mark H. Shwert, Andover, Mass.

[73] Assignee: Maxager Technology, Inc., San Rafael, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/539,608

[22] Filed: Oct. 5, 1995

[51] Int. Cl.$^6$ .................................................. G06F 17/60
[52] U.S. Cl. ................. 705/7; 364/468.03; 364/468.15; 364/468.18; 377/16
[58] Field of Search ...................................... 395/207, 208, 395/209; 364/468, 468.5, 468.6, 400, 468.03, 468.15, 468.18; 377/13, 15, 16; 705/1, 7, 8, 9, 400

[56] References Cited

U.S. PATENT DOCUMENTS

| | | | |
|---|---|---|---|
| 3,344,408 | 9/1967 | Singer et al. | 395/184.01 |
| 4,346,446 | 8/1982 | Erbstein et al. | 702/182 |
| 5,077,661 | 12/1991 | Jain et al. | 364/402 |
| 5,229,948 | 7/1993 | Wei et al. | 395/207 |
| 5,249,120 | 9/1993 | Foley | 364/401 |
| 5,260,868 | 11/1993 | Gupta et al. | 364/402 |
| 5,291,397 | 3/1994 | Powell | 364/402 |
| 5,369,570 | 11/1994 | Parad | 364/401 |
| 5,446,671 | 8/1995 | Weaver et al. | 395/207 |
| 5,524,077 | 6/1996 | Faaland et al. | 364/402 |
| 5,532,928 | 7/1996 | Stanczyk et al. | 364/406 |
| 5,586,021 | 12/1996 | Fargher et al. | 395/207 |
| 5,765,137 | 6/1998 | Lee | 705/7 |
| 5,819,232 | 10/1998 | Shipman | 705/8 |

*Primary Examiner*—Edward R. Cosimano
*Attorney, Agent, or Firm*—Fliesler, Dubb, Meyer & Lovejoy, LLP

[57] ABSTRACT

A cycle time method and apparatus is provided to obtain cost, efficiency, bottleneck and value creation information in a manufacturing facility. The manufacturing facility includes a plurality of production lines with each production line including a plurality of process steps. A work cell which includes a plurality of workers is responsible for each process step. Each work cell has an associated local processing apparatus for inputting process step quantity and time information. The local processing apparatus is coupled to a central processing apparatus via local area network. The central processing apparatus then identifies and calculates bottleneck costing information regarding the process steps, as well as the manufacturing facility bottleneck. Bottleneck cost information for products are then calculated based upon the manufacturing facility bottleneck or factory bottleneck. The bottleneck costing information is then transferred to a printer or projection display nearby a work cell.

38 Claims, 20 Drawing Sheets

WORKCELL YIELD REPORT: 3/19/95 THROUGH 3/25/95

| CUSTOMER: | ALL | DIVISION: | | TEAM: | YELLOW |
| --- | --- | --- | --- | --- | --- |
| LOCATION: | | PROD TYPE: | ALL | WORK CELL: | CUT/TAPE |
| MACH./PROC: | ALL | STOCK NO.: | ALL | SHIFT: | 3 |

| | TOTAL REELS: | 17 | | | |
| --- | --- | --- | --- | --- | --- |
| | THRUPUT (k): | 160 | YIELD %: | 87.7% | |
| | SCRAP (k): | 23 | SCRAP %: | 12.3% | |

| STOCK NUMBER | NUMBER OF REELS | ACCEPT QTY (k) | COMPLETE QTY (k) | THRUPUT QTY (k) | SCRAP QTY (k) | YIELD % |
| --- | --- | --- | --- | --- | --- | --- |
| 50802 | 2 | 13.38 | 13.25 | 13.25 | 0.13 | 99% |
| A58880 | 4 | 28.52 | 28.61 | 27.73 | 0.79 | 97% |
| A58601 | 2 | 13.79 | 14.90 | 13.01 | 0.78 | 94% |
| B59209 | 3 | 33.22 | 30.60 | 29.81 | 3.41 | 90% |
| A58563 | 2 | 48.71 | 42.94 | 42.54 | 6.17 | 87% |
| A58645 | 2 | 32.90 | 14.00 | 25.25 | 7.65 | 77% |
| A58707 | 1 | 6.06 | 5.75 | 4.54 | 1.52 | 75% |
| A58503 | 1 | 6.35 | 6.90 | 4.30 | 2.05 | 68% |

FIG. 10

WORKCELL THRUPUT REPORT: 3/19/95 THROUGH 3/25/95

| CUSTOMER: | ALL | DIVISION: | ALL | | TEAM: | YELLOW | |
|---|---|---|---|---|---|---|---|
| LOCATION: | | PROD TYPE: | ALL | | WORK CELL: | CUT/TAPE | AVG GROSS CYCLE TIME: |
| PROCESS: | ALL | STOCK NO.: | ALL | | SHIFT: | 3 | 1:3:50 |
| GCT/REEL | 1.160 | TOTAL REELS: | | 17 | SCRAP %: | 12.3% | AVG NET CYCLE TIME: |
| NCT/REEL | 0.226 | THRUPUT (k): | | 160 | YIELD %: | 87.7% | 0:5:25 |
| | | SCRAP (k): | | 23 | FLOW RATE(P/HR) | 1,740 | |

| STOCK NUMBER | NUMBER OF REELS | THRUPUT QTY (k) | YIELD % | GROSS CYCLE (DD:HH:MM) | NET CYCLE (DD:HH:MM) | NET FLOW RATE (PARTS/HR) |
|---|---|---|---|---|---|---|
| A58563 | 2 | 42.54 | 87% | 0:11:22 | 0:11:11 | 1,900 |
| B59209 | 3 | 29.81 | 90% | 2:11:24 | 0:04:18 | 2,306 |
| A58880 | 4 | 27.73 | 97% | 0:04:38 | 0:03:19 | 2,087 |
| A58645 | 2 | 25.25 | 77% | 0:10:16 | 0:04:04 | 3,093 |
| 50802 | 2 | 13.25 | 99% | 2:15:13 | 0:02:56 | 2,252 |
| A58601 | 2 | 13.01 | 94% | 0:14:22 | 0:02:37 | 2,483 |
| A58707 | 1 | 4.54 | 75% | 1:22:51 | 0:06:42 | 677 |
| A58503 | 1 | 4.30 | 68% | 1:07:19 | 0:17:36 | 244 |

FIG. 11

| DAILY REEL PRODUCTION SUMMARY | | | | FOR THE PERIOD: | | 3/26/95 | TO | 4/1/95 | | | | |
|---|---|---|---|---|---|---|---|---|---|---|---|---|
| CUSTOMER ALL | DIVISION | | ADVANCED PRODUCTS GROUP | | PRODUCT GROUP | | ALL | WORKORDER | | ALL | | |
| LOCATION ALL | TEAM | | ALL | | PRODUCT TYPE | | ALL | REEL | | ALL | | |
| COMPANY | WORKCENTER | | ALL | | STOCK NUMBER | | ALL | | | | | |
| | CYCLE TIME SUMMARY: | | | AVG CYCLE TIME PER REEL: | | | UNIT SUMMARY: | | | CT COST SUMMARY: | | |
| | GROSS CYCLE TIME: | | 2323:16:48 | GROSS CT/REEL: | | 17.34 | GROSS UNITS(K): | | 1,821 | NET CT COST: | | 0 |
| | NET CYCLE TIME | | 576:22:20 | NET CT/REEL: | | 4.31 | NET THRUPUT(K): | | 1,243 | NET RM COST: | | 45,141 |
| | SAVINGS OPP'Y: | | 1746:18:28 | | | | SCRAP UNITS(K): | | 579 | SCRAP COST: | | 18,113 |
| | FLOW EFFICIENCY: | | 25% | REELS PROCESSED: | | 134 | OVERALL YIELD% | | 68% | TOTAL COST: | | 63,254 |

| DATE | NUMBER OF REELS | NET UNIT VOLUME K | GROSS CYCLE TIME HRS/K | NET CYCLE TIME HRS/K | GROSS FLOW RATE PARTS/HR | NET FLOW RATE PARTS/HR | YIELD% | FLOW EFFICIENCY | NET CT COST $ | NET RM COST $ | SCRAP COST $ | TOTAL COST $ |
|---|---|---|---|---|---|---|---|---|---|---|---|---|
| 3/26 | 0 | | | | | | | | | | | |
| 3/27 | 10 | 74 | 46.62 | 16.92 | 21 | 59 | 64% | 36% | 0 | 3,388 | 1,782 | 5,170 |
| 3/28 | 13 | 132 | 43.61 | 9.19 | 23 | 109 | 81% | 21% | 0 | 5,086 | 1,353 | 6,440 |
| 3/29 | 31 | 331 | 44.93 | 10.91 | 22 | 92 | 66% | 24% | 0 | 6,328 | 2,207 | 8,535 |
| 3/30 | 31 | 170 | 92.76 | 30.23 | 11 | 33 | 49% | 33% | 0 | 7,497 | 5,155 | 12,652 |
| 3/31 | 15 | 223 | 10.48 | 1.84 | 95 | 544 | 73% | 18% | 0 | 7,483 | 2,718 | 10,201 |
| 4/1 | 34 | 312 | 43.40 | 7.07 | 23 | 142 | 79% | 16% | 0 | 15,358 | 4,898 | 20,257 |

FIG. 13

CTC WO SUMMARY REPORT                                04/14/95 09:49 PAGE 1

| ITEM | WO | LINE | OPER | FUNCTION | EMP ID | EMP NAME | TY | QTY | DATE | TIME | WC | SCRAP | R1 | R2 | R3 | R4 |
|---|---|---|---|---|---|---|---|---|---|---|---|---|---|---|---|---|
| A58447 | 6211 | 0001 | 10 | DRY ETCH | M2264 | JOHN DOE | IN | 5.61 | 03/29/95 | 11:54:19 | CELLT101 | | | | | |
| A58447 | 6211 | 0001 | 10 | DRY ETCH | M2264 | JOHN DOE | RS | 6.17 | 03/29/95 | 11:55:00 | CELLT101 | | | | | |
| A58447 | 6211 | 0001 | 10 | DRY ETCH | M2264 | JOHN DOE | CM | 6.17 | 03/29/95 | 14:03:51 | CELLT101 | | | | | |
| A58447 | 6211 | 0001 | 20 | WET ETCH | 58016 | JEFF BROWN | IN | 6.17 | 03/29/95 | 16:03:34 | CELLT201 | | | | | |
| A58447 | 6211 | 0001 | 20 | WET ETCH | AJA | | IC | 6166.83 | 03/29/95 | 16:37:29 | CELLT201 | | | | | |
| A58447 | 6211 | 0001 | 20 | WET ETCH | M3984 | JANE SMITH | RS | 6.01 | 03/30/95 | 22:47:31 | CELLT201 | .15 | 49 | | | |
| A58447 | 6211 | 0001 | 20 | WET ETCH | M3984 | JANE SMITH | CM | 6.01 | 03/30/95 | 05:25:02 | CELLT201 | .15 | 49 | | | |
| A58447 | 6211 | 0001 | 30 | PLATE | 21902 | JIM SMITH | IN | 6.01 | 03/31/95 | 01:23:28 | CELL0301 | | | | | |
| A58447 | 6211 | 0001 | 30 | PLATE | M3570 | GREG JONES | RS | 5.60 | 03/31/95 | 01:23:42 | CELL0301 | | | | | |
| A58447 | 6211 | 0001 | 30 | PLATE | M3570 | GREG JONES | CM | 5.60 | 03/31/95 | 03:38:26 | CELL0301 | | | | | |
| A58447 | 6211 | 0001 | 40 | TAPE | 61043 | MARY PARKER | IN | 5.60 | 04/07/95 | 13:33:52 | CELL0401 | .20 | 30 | 85 | | |
| A58447 | 6211 | 0001 | 40 | TAPE | 5574 | TONY ROCCA | RS | 5.00 | 04/07/95 | 13:34:09 | CELL0401 | .20 | 30 | 85 | | |
| A58447 | 6211 | 0001 | 40 | TAPE | 5574 | TONY ROCCA | CM | 5.00 | 04/07/95 | 16:24:20 | CELL0401 | | | | | |
| A58447 | 6211 | 0001 | 50 | CUT | 5574 | TONY ROCCA | IN | 5.00 | 04/07/95 | 16:25:52 | CELL0401 | | | | | |
| A58447 | 6211 | 0001 | 50 | CUT | 5574 | TONY ROCCA | RS | 5.00 | 04/07/95 | 16:26:06 | CELL0401 | | | | | |
| A58447 | 6211 | 0001 | 50 | CUT | 5574 | TONY ROCCA | CM | 5.00 | 04/07/95 | 16:26:24 | CELL0401 | | | | | |
| A58447 | 6211 | 0001 | 60 | SORT/PAK | 5421 | LILY DOE | IN | 5.00 | 04/07/95 | 19:56:39 | CELL0701 | | | | | |
| A58447 | 6211 | 0001 | 60 | SORT/PAK | 5421 | LILY DOE | RS | | 04/11/95 | 19:59:02 | CELL0701 | | | | | |
| A58447 | 6211 | 0001 | 8400 | | | | WC | 4.24 | | | STORES | | | | | |

FIG. 14

WORKCELL VALUE CREATION: 3/19/95 THROUGH 3/25/95

| CUSTOMER: | ALL | DIVISION: | | TEAM: | YELLOW | REVENUE | 16,043 |
|---|---|---|---|---|---|---|---|
| LOCATION: | | PROD TYPE: | ALL | WORK CELL: | CUT/TAPE | VALUE | 7,052 |
| PROCESS: | ALL | STOCK NO.: | ALL | SHIFT: | 3 | | |
| | | | | | | | |
| TOTAL REELS: | 17 | AVG SCRAP %: | 12.3% | GROSS CT | 19:17:26 | SCRAP | 949 |
| THRUPUT (K): | 160 | AVG YIELD %: | 87.7% | NET CT | 3:20:11 | OPP'Y COST | |
| SCRAP (K): | 23 | FLOW RT (P/HR): | 6,600 | FLOW EFF'Y | 19.5% | | |

| STOCK NUMBER | THRUPUT QTY (k) | FACTORY REVENUE | RM COST | CYCLE TIME COST | SCRAP COST | LABOR COST | VALUE CREATED |
|---|---|---|---|---|---|---|---|
| 50802 | 13.25 | 1,325 | 99.0% | 4.7% | 1 | 100.0% | 61 |
| A58503 | 4.30 | 430 | 67.7% | 56.2% | 78 | 100.0% | 164 |
| A58563 | 42.54 | 4,254 | 87.3% | 98.5% | 530 | 100.0% | 3,659 |
| A58601 | 13.01 | 1,301 | 94.3% | 18.2% | 13 | 100.0% | 224 |
| A58645 | 25.25 | 2,525 | 76.7% | 39.7% | 233 | 100.0% | 770 |
| A58707 | 4.54 | 454 | 74.9% | 14.3% | 16 | 100.0% | 49 |
| A58880 | 27.73 | 2,773 | 97.2% | 71.7% | 55 | 100.0% | 1,932 |
| B59209 | 29.81 | 2,981 | 89.7% | 7.3% | 22 | 100.0% | 194 |

FIG. 18

METHOD AND APPARATUS FOR IDENTIFYING AND OBTAINING BOTTLENECK COST INFORMATION

BACKGROUND OF THE INVENTION

1. Field of the Invention

The present invention relates to obtaining cost information. In particular, the present invention relates to a method and apparatus for determining the cost of products in a manufacturing facility, thereby improving efficiency and profitability in manufacturing products.

2. Description of the Related Art

Manufacturing facilities are extremely complex and must accommodate: 1) a number of process steps; 2) a wide variety of products; and 3) a wide range of units per customer order. For example, a manufacturing facility which produces lead frames for semiconductor devices may have to produce 750 distinct types of lead frames. A lead frame may have from 8 leads to 208 leads. Some lead frame types may require relatively simple manufacturing steps, where other lead frames may require many complex process steps. Order quantities from customers can range from 10,000 units per order up to 1,000,000 units per order.

Based on a customer order, workorders are generated listing what type of, and how many, products must be manufactured to fill a customer order. A workorder will include a lot number identifying a quantity of material which will be processed into manufactured products. In the lead frame manufacture example, a lot is a reel of metal which will be processed to produce multiple lead frames. Generally, a shop packet or paper printout listing the workorder and other information accompanies lots or reels during the manufacturing process.

A manufacturing facility generally includes a large number of production lines producing an array of distinct products. Each production line may include a number of process steps in manufacturing the final product. In the lead frame manufacturer example, process steps may include a dry etching step and a plating step, among a number of other process steps, in producing the lead frame product supplied to a customer In each process step, there may be a time period wherein the units are being processed by a machine or undergoing a production run. When the units are not undergoing a production run, the units may be waiting or queued for another process step.

Each process step may have groups of workers organized in teams to complete a particular process step. There may also be multiple shifts or different time periods during a given day where a different group of workers are assigned to a production line for a particular process step.

In most modern manufacturing facilities, a type of system known as Manufacturing Resource Planning ("MRP") is used to keep track of work orders flowing through the production process. For example, an MRP system known as CHESS, supplied by McDonnell Douglas Information Systems, located at Long Beach, Calif. attempts to optimize the manufacturing process by intertwining various software modules. Typically, one module of an MRP system is the costing module.

From costing studies using a typical number of units produced under typical factory conditions, a "standard cost" is determined for each product. This standard cost comprises two component costs: 1) raw material costs per unit; and 2) overhead allocation cost per unit. The standard cost is input into a costing module database accessible by the MRP system. As products flow through the production process, these standard costs are attributable to specific customer orders to determine whether the total cost of these units to the customer was less than, or greater than, the price charged to the customer.

However, these MRP software packages do not accurately provide real-time detail information regarding the manufacturing process. In particular, these MRP software packages do not provide detailed information regarding specific process steps or obtain data on the actual production experience of each and every work order as it flows through the factory. MRP systems do not obtain cost information in real-time or as products are being manufactured at specific process steps. MRP systems rely upon standard costs in a database which may not accurately reflect the current number of units produced or current factory conditions. In order to obtain accurate cost information in MRP systems, additional cost studies requiring substantial amounts of clerical and administration costs is required. Because adequate information from specific process steps is not obtained, accurate information identifying how the manufacture of a specific product can be improved by improving particular process steps and their interaction is not possible. For example, during a particular process step or cycle, it is not known what amount of time is used in setting up the process or machine, rather than actually running the process. Further, there is not adequate information as to how much and how long inventory has been waiting before undergoing a production run in a particular process step. Likewise, during the process step itself, there may not be accurate information as to the production run machine speed and whether process innovations or improved machines may enable a more efficiently manufactured final product. Further, there is no adequate information in regard to the inventory of completed process step units awaiting a next process step. There is no adequate information regarding when a process should be completed in order to coincide with a next process step processing capability.

Similarly, adequate information regarding the efficiency or yield of a particular process step is not available. For example, adequate information regarding the amount of scrap or unusable completed process step units which should be allocated to a particular process step is not taken into account. Scrap units created in one process step may not be identified until a few process steps later. Thus, certain process steps may appear to be efficient while their scrap units are not accurately being identified.

Further, typical costing methods called standard costing or "activity-based costing" only determine the amount of time a typical product workorder spends at each manufacturing step and multiplies this time by a time charge for equipment and labor associated with each manufacturing step. The total cost to manufacture the product is then determined by adding together the costs of each manufacturing step. However, these methods do not determine which process step in the series of production steps is the bottleneck for a specific product type and work order quantity.

Also, value creation information in a process step must be identified. A process step should be able to compare with previous production runs how efficient units are processed with respect to yield, flow efficiency and labor efficiency.

Therefore, it is desirable to provide a method and apparatus which provides information concerning cost, efficiency, bottlenecks, scrap and value creation in particular process steps in manufacturing a product. Further, it is desirable to obtain not only cost, efficiency, bottleneck, scrap and value creation regarding a specific process step in manufacturing a product, but to obtain this information in all products in a manufacturing facility with a wide range of customer order quantities. This information should be obtained continuously in real-time using actual production information without requiring a priori costing studies.

SUMMARY OF THE INVENTION

Other aspects and advantages of the present invention can be seen upon review of the figures, the detailed description, and the claims which follow.

According to the present invention, a method is provided which allows for identifying factory bottlenecks and obtaining cost information based on the factory bottleneck in a manufacturing facility using time and quantity data from a work cell. The time and quantity data is stored in memory.

A factory bottleneck is determined by either 1) thruput $ value of products or 2) physical product flow rate. A thruput $ value factory bottleneck is determined by calculating processing times of products in process steps responsive to the time and quantity data. A total processing time for a process step is then obtained by summing the processing times associated with each product. A total thruput $ value for products in respective process steps is then calculated. A thruput rate for each process step is calculated based upon the total processing times and total thruput $ values. The process step with the minimum thruput rate then identifies the factory thruput $ bottleneck.

Similarly, a factory bottleneck based on physical unit flow of products may be obtained by taking the unit output value (completed products) and dividing the unit output value by the net cycle times required to produce the output for each process step. In this case, the process step with the minimum unit flow rate identifies the factory bottleneck.

According to another aspect of the invention, processing time is calculated by the equation:

$$WPTw_jl_tc_yp_z=(BTDw_jl_tc_yp_z-ATDw_jl_tc_yp_z)+((CTDw_jl_tc_yp_z-BTDw_jl_tc_yp_z)*WWYp_z).$$

According to another aspect of the invention, processing time is calculated by the equation:

$$WPTw_jl_t=(BTDw_jl_tc_yp_z-ATDw_jl_tc_yp_z)+((CTDw_jl_tc_yp_z-BTDw_jl_tc_yp_z)).$$

According to another aspect of the invention, total processing time at a processing step is calculated by the equation:

$$PTp_z=\Sigma WPTp_z.$$

According to another aspect of the invention, total thruput $ value is calculated by the equation:

$$T\$p_z=\Sigma(ASPs_x-RMCs_x)*NAQs_xp_z.$$

According to another aspect of the invention, thruput rate is calculated by the equation:

$$T\$Rp_z=T\$p_z/PTp_z.$$

According to another aspect of the invention, product flow rate is calculated by the equation:

$$FR=\Sigma NAQs_xp_z/\Sigma NCTs_xp_z.$$

In another aspect of the present invention, bottleneck cost information for a product in a manufacturing facility is obtained. Time and quantity information for a work cell is stored in a memory location. Total product yield is calculated. Raw material cost is calculated in response to total yield. Bottleneck time charge and bottleneck processing time are obtained. Stocknumber bottleneck time cost is calculated in response to bottleneck time charge and bottleneck processing time. Total stocknumber bottleneck cost is then calculated in response to stocknumber bottleneck time cost and the raw materials cost.

According to another aspect of the invention, total product yield is calculated by the equation:

$$NYs_x=Ys_xp_1*Ys_xP_2*Ys_xp_3*Ys_xp_4*Ys_xp_5.$$

According to another aspect of the invention, raw material cost is calculated by the equation:

$$RMCs_x=RMs_x/NYs_x.$$

According to another aspect of the invention, bottleneck time charge is calculated by the equation:

$$BTC=\text{Operating Expenses/Time}$$

According to another aspect of the invention, bottleneck processing time is calculated by the equation:

$$SWBTs_x=WPTw_jl_tc_yp_{bottleneck}s_x/NAQw_jl_tc_yp_{bottleneck}s_x.$$

According to another aspect of the invention, stocknumber bottleneck time is calculated by the equation:

$$SBTs_x=SWBTs_x \text{ as function of } NAQs_x.$$

According to another aspect of the invention, stocknumber bottleneck time cost is calculated by the equation:

$$BCs_x=SBTs_x*BTC.$$

According to another aspect of the invention, total stocknumber bottleneck cost is calculated by the equation:

$$TBCs_x=BCs_x+RMCs_x.$$

According to another aspect of the invention, an article of manufacture including a computer readable medium determines a bottleneck for a product in a manufacturing facility. The article of manufacture includes computer readable program code means for causing a computer to calculate processing time responsive to time and quantity data. Computer readable program means also causes a compute to calculate a total thruput value and thruput rate. Computer readable program means then causes a computer to select a minimum thruput rate corresponding to the bottleneck.

The novel method automatically collects the time and quantity data in the current production cycle of all units in the manufacturing facility. The actual cost of each work order and each product unit is calculated in real-time. The method eliminates the requirement for costing studies and the setting of standard costs. Further, the invention eliminates a substantial amount of clerical and administrative costs, while generating real-time accurate and continuous cost information.

In another aspect of the invention, an apparatus improves a manufacturing facility which includes a work cell for completing a process step. Means for obtaining unit quantity and time data from the work cell is coupled to means for calculating cycle time cost data. Means for outputting the work cell cycle time cost data is then coupled to the means for calculating. The unit quantity and time data includes unit acceptance quantity, unit acceptance and set-up time, begin run time, unit complete quantity and unit complete time.

In another aspect of the invention, the means for obtaining includes a bar code scanner coupled to a computer. The means for calculating includes a computer coupled to a network. The means for outputting includes a printer, projection screen or display screen.

In another aspect of the invention, a system improves factory profitability. The factory includes a plurality of production lines and each production line includes a plurality of work cells. Means for obtaining unit information from a work cell in a production line is coupled to local processing means for storing unit information. Central processing means for calculating cycle time data is coupled to the local processing means. Means for outputting the cycle time data is then coupled to the central processing means. The work cell cycle time data includes, among other information, gross cycle time, net cycle time, throughput, yield and bottleneck information.

In another aspect of the invention, the means for obtaining includes a keyboard coupled to a computer. The local processing means includes a computer coupled via network to a central processing unit, including a server coupled to a computer. The central processing means includes a work cell activity module, a work cell value creation module, a manager report module, a bottleneck costing module and a scrap chargeback module.

BRIEF DESCRIPTION OF THE DRAWINGS

This invention will be described with respect to the particular embodiments thereof, and reference will be made to the drawings, in which:

FIG. 10 illustrates a work cell yield report output from the work cell activity module logic according to the present invention;

FIG. 11 illustrates a work cell throughput report output from the work cell activity module logic according to the present invention;

FIG. 13 illustrates a daily real production summary output from the manager report module logic according to the present invention;

FIG. 14 illustrates a workorder summary report output from the work cell activity module logic according to the present invention;

FIG. 18 illustrates a value creation report output from the value creation logic according to the present invention.

DETAILED DESCRIPTION OF THE INVENTION

Figure 1:
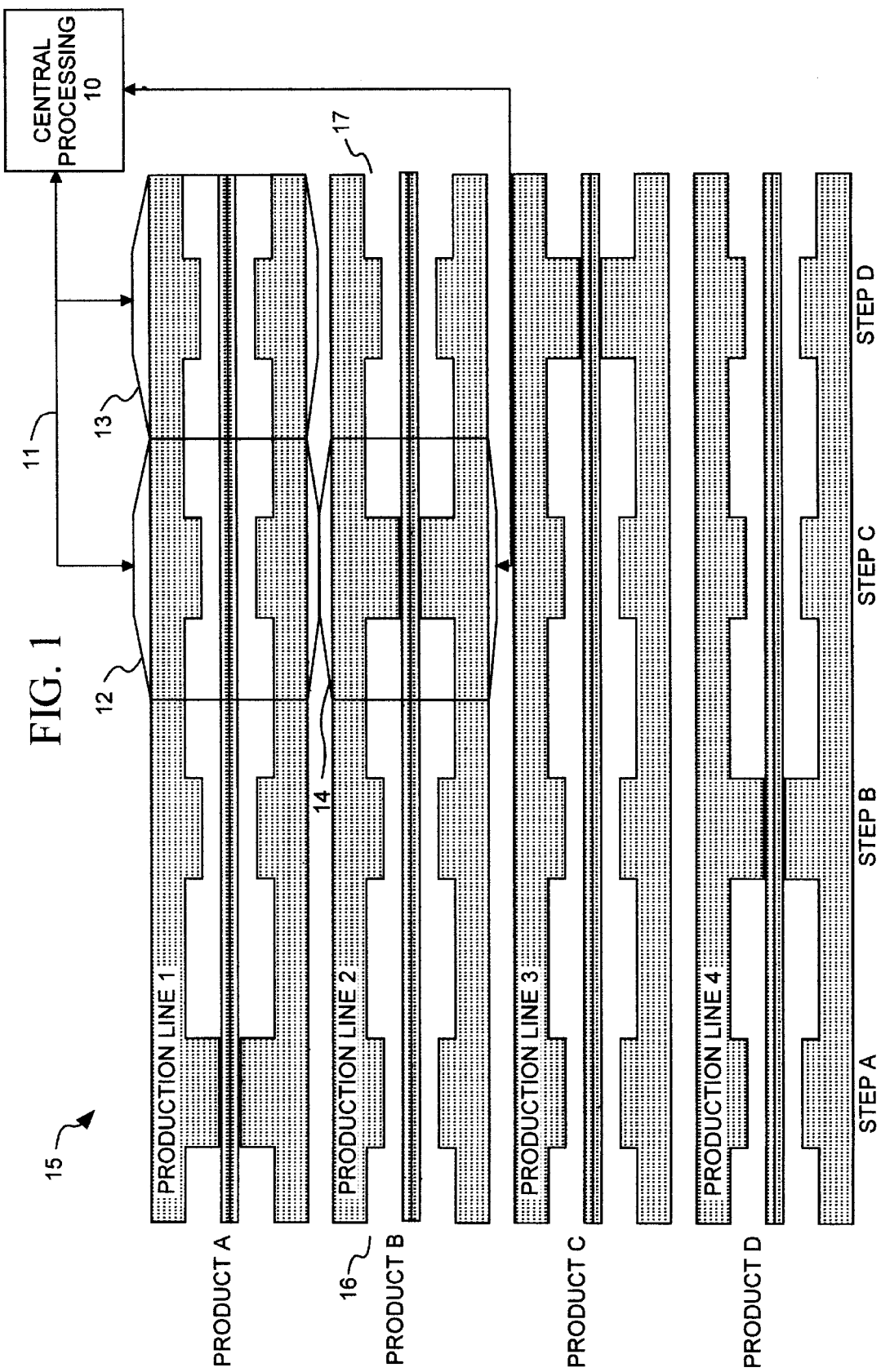
FIG. 1 illustrates a manufacturing facility having a plurality of production lines and a plurality of process steps according to the present invention.

FIG. 1 illustrates a manufacturing facility 15 according to the present invention. In an embodiment, manufacturing facility 15 includes production lines 1–4. Production lines 1–4 manufacture products A–D. The beginning of a production line is identified by reference number 16, while the end of the production line is identified by reference number 17. In each production line, there are a number of processing steps A–D. In an alternate embodiment, there may be far greater or lesser production lines and process steps. Also, various production lines could be located at different manufacturing facility locations.

In an embodiment of the present invention, a lead frame manufacturing facility produces multiple types of lead frames for various semiconductor devices. Product A is a lead frame having only 8 leads, while product B is a lead frame having 208 leads. In the lead frame manufacturing facility embodiment, step A may include a dry etching process step, wet etching process step, or a stamping process step. Process step B could include a plating step, while steps C and D could include cut/tape and sort/pack process steps, respectively.

In alternate embodiments, product A and product B could be the same product having the same stocknumber. Moreover, a number of units which have completed process step A in production line 1 could undergo process step B in production line 1 or process step B in production line 2. While the present invention has been described in terms of a production line; the present invention also may be implemented in a job shop environment where units are being processed or transferred from one job shop location or work cell to another job shop location or work cell.

Manufacturing facility 15 is also partitioned into work cells. For example, work cells 12, 13 and 14 are indicated in production line 1 and production line 2. A work cell may also include a plurality of teams and may have multiple shifts or periods of time during the day when a given group in a work cell completes or is responsible for a particular process step. A work cell team includes a number of workers responsible for a particular process step. In the present embodiment, 7 workers would be assigned to a particular work cell team. More or less workers could also be assigned to a particular work cell team. Time and quantity information associated with each work cell is obtained and transferred on network 11 to central processing 10. While FIG. 1 only illustrates 3 work cells, it should be understood that, preferably, each process step in a production line would have an associated work cell.

Each production line and/or process step may have an associated product bottleneck. For example, production line 2 in work cell 14 illustrates a bottleneck in the manufacture of product B. A product bottleneck is defined as the process step in a given production line which limits the capability, for various reasons, of the ultimate manufacture of a product. A product bottleneck may be defined based on quantity of products or value of products, such as thruput $, produced. The bottleneck step is the step which yields the fewest quantity or value per unit of time, such as minute of process time. Similarly, there may be a factory bottleneck which is defined as the particular process step which limits the number of products which may be produced by the entire factory. Like the bottleneck on a freeway, or the rate limiting step in a chemical reaction, the manufacturing bottleneck step determines the rate at which a product type, or all products together in the case of a factory bottleneck, may flow through the entire factory. Bottlenecks will be discussed in particular detail below.

Figure 2:
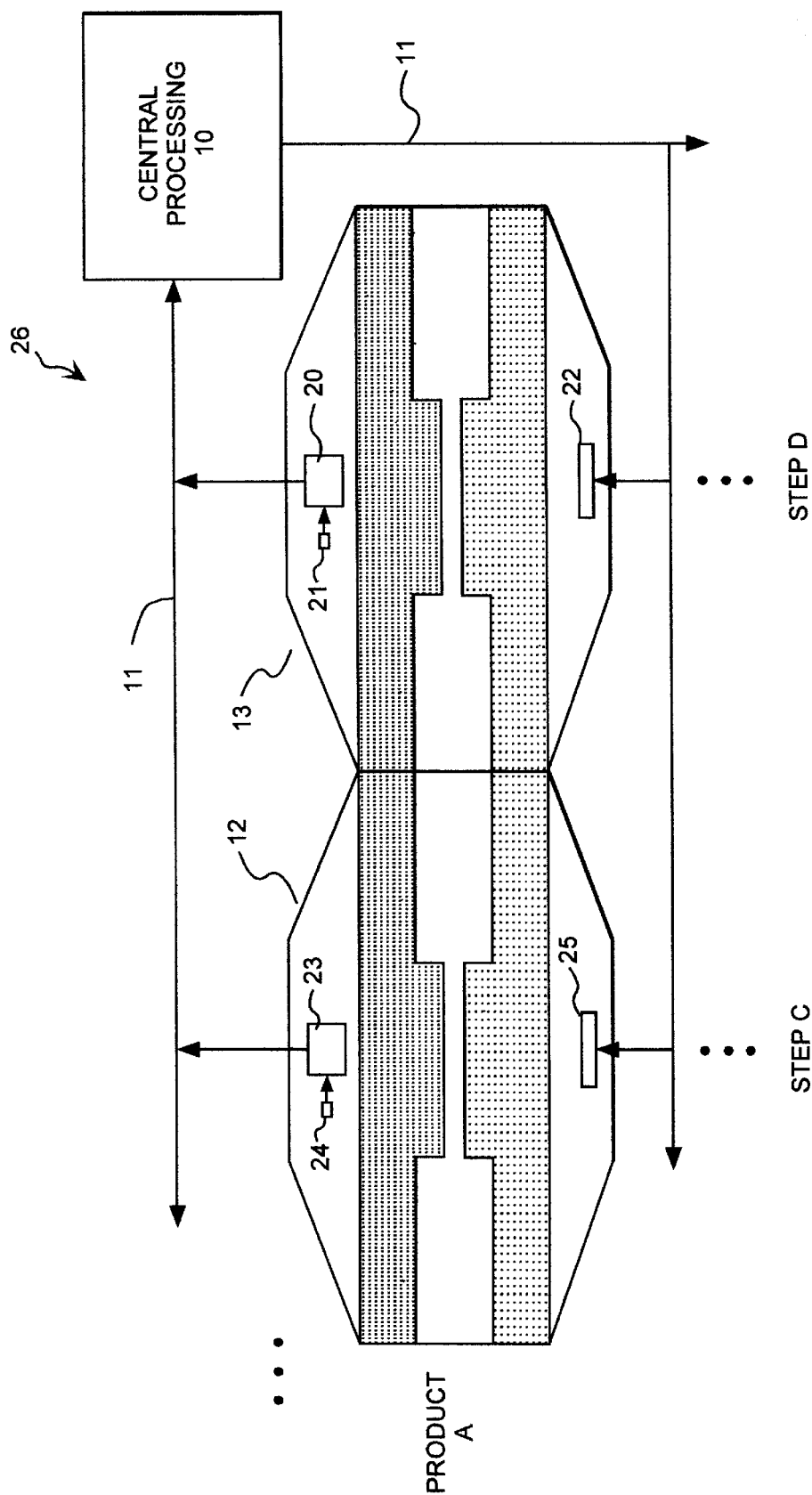
FIG. 2 illustrates a portion of the manufacturing facility shown in FIG. 1 which includes work cells according to the present invention.

FIG. 2 illustrates a portion of the manufacturing facility 15 as shown in FIG. 1. In particular, FIG. 2 illustrates a cycle time system 26 according to the present invention. Work cells 12 and 13, for example, communicate with central processing 10 by bus 11. In the preferred embodiment, central processing 10 includes a Hewlett Packard 9000 server supplied by Hewlett Packard ("HP"), located at Santa Clara, Calif. and a personal computer, supplied by International Business Machines, Inc. ("IBM"), located at Armonk, N.Y. In an embodiment, bus 11 is a local area network.

In an embodiment, work cell 13 and work cell 12 include local processing devices 20 and 23, respectively, which are coupled to bus 11. In an embodiment, local processing devices 20 and 23 are personal computers supplied by IBM. Local processing devices 20 or 23 have associated keyboards and displays. The keyboard may be used to input work cell time and quantity data. Local processing devices 20 and 23 are also coupled to bar code scanners 21 and 24 in order to input work cell time and quantity data. The bar code scanners may be connected directly by wire to the local processing device or connected by wireless communication such as radio frequency signals. Bar code scanners may obtain work cell time and quantity information from bar codes on a shop packet.

In an embodiment, the bar code scanners are supplied by Intermec, Inc., located at Everett, Wash. Work cell time and quantity data is transferred to central processing unit 10 via bus 11 by using bar code scanners 21 and 24 and/or a keyboard coupled to local processing devices 20 and 23.

Bottleneck costing data, along with other cycle time data, calculated from work cell time and quantity data, is output on bus 11 to local processing unit 20, 23 and/or displays 22 and 25. In addition, the cycle time data may be printed. While each work cell may have a local processing apparatus, bar code scanner and display, in alternate embodiments, work cells may share local processing devices, bar code scanners and displays coupled to bus 11.

In an embodiment, the present invention calculates the cost of manufacturing a product (apart from raw material cost) by using a Bottleneck Time Charge ("BTC"). The Bottleneck Time Charge reflects the actual cost of manufacturing by absorbing the expenses of the manufacturing plant over the production time in the plant's bottleneck, which determines the effective capacity of the plant. Bottleneck Time Charge is defined as:

$$BTC = \text{Operating Expenses/Bottleneck Processing Time} \quad (\text{Equ.1})$$

In the present embodiment, Operating Expenses are the total expenses of the plant, including payroll and depreciation, but excluding raw materials. Bottleneck Processing Time is determined for the factory's bottleneck by adding the processing times, as described below in Equations 13 or 14, in the factory's bottleneck process step for all workorder/lots processed. Thus, in order to determine a bottleneck time charge ("BTC"), the factory's bottleneck process step must be determined.

When this Bottleneck Time Charge ("BTC") is multiplied by a particular stocknumber workorder/lot bottleneck time or the time required for a particular stocknumber to complete the process step identified as the bottleneck, described below in Equations 22, 23 and 24, the stocknumber bottleneck cost ("$BCS_x$") per unit for that product can be determined. By knowing the bottleneck cost per unit of a product, instead of the typical standard cost, a more precise and accurate cost of manufacturing a product is obtained.

In typical MRP systems, the cost associated with a finished product would be determined by adding the various process steps raw materials costs per unit, and possibly labor costs, to obtain a final cost of a finished product. This method of obtaining cost information does not take into account the time associated with each process step or factory cash contribution per unit. MRP systems do not obtain quantity and time information associated with each work cell in order to determine more accurate cost and efficiency information. For example, MRP systems would not be able to determine how much time is actually taken in setting up a process step machine or preparing units to be processed and how much time is actually associated with the actual processing. Moreover, these MRP systems do not accurately account for the amount of scrap units associated with each process step or identify which work cell is responsible for creating the scrap units. For example, process step A may generate scrap units which are not detected until process step C. Thus, process step A should be charged for the scrap units.

Figure 3:
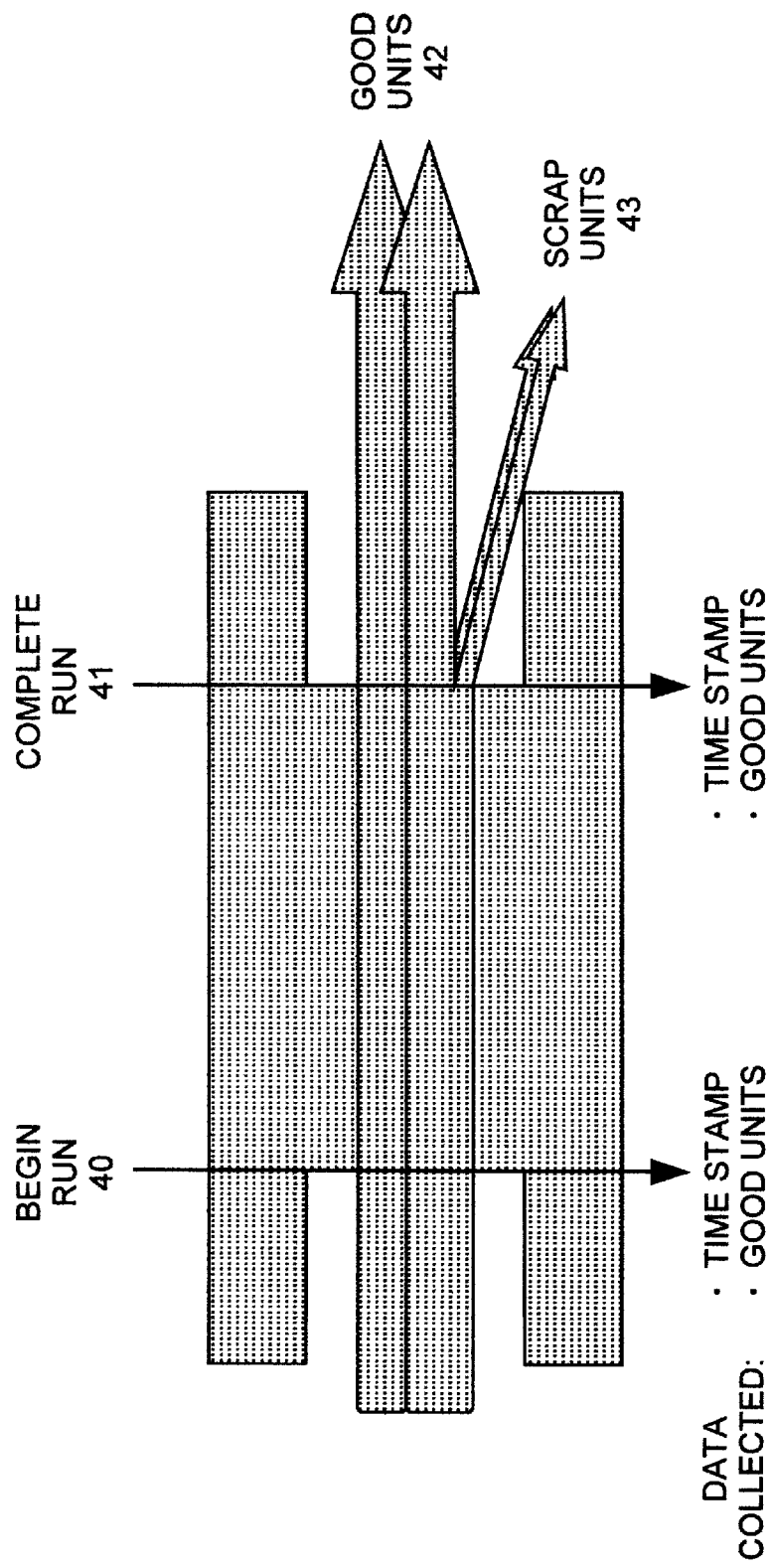
FIG. 3 illustrates outputting unit quantity information from a work cell, including good units and scrap units after completing a process step according to the present invention.
Figure 4:
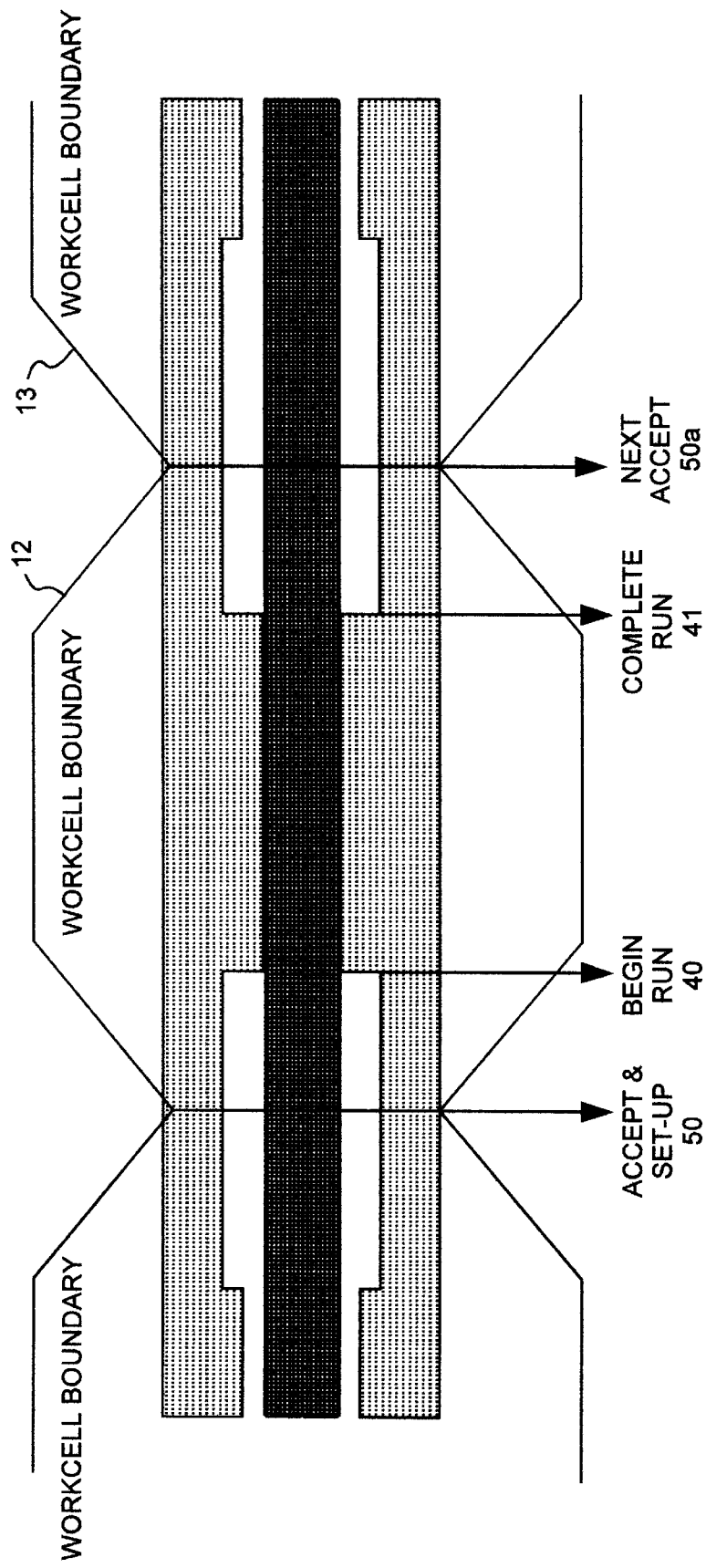
FIG. 4 illustrates outputting timing information from a work cell, including accept, begin and complete timing data, of a typical process step in a work cell according to the present invention.

FIGS. 3 and 4 illustrate how time and quantity data is obtained from each work cell. A worker in a work cell begins the set-up for processing a workorder/lot by inputting the accept quantity ("AQ") number into a local processing device. The local processing device then time stamps the AQ quantity at accept and set-up 50 time ("ATD") in FIG. 4. Similarly, when the production run of a process step is initiated in a work cell, a worker must input into a local processing device the begin run time 40 ("BTD") and the complete run time 41 ("CTD") when the production run is initiated and completed, respectively. Immediately prior to the completion of a process step, a worker will input the quantity of good units 42 ("CQ"). Local processing devices may automatically time date or identify BTD time and CTD time when a worker inputs quantity of units processed by either a bar code scanner or keyboard. As the worker inputs the ATD time, BTD time, CTD time, AQ quantity and CQ quantity data, either directly or indirectly by local processing device time stamps, worker's badge number, shift number and manufacturing location are also input.

The next work cell, for example, work cell 13, will then likewise have a worker input the AQ quantity and ATD time, which is also the next accept ("NAQ") quantity and next accept time ("NATD") 50($a$) for work cell 12, in a local process device in work cell 13. For example, when a worker in work cell 13 inputs an AQ quantity and ATD time, central processing 10 automatically assigns the AQ quantity and ATD time in work cell 13 as the NAQ quantity and NATD time for work cell 12.

Figure 5:
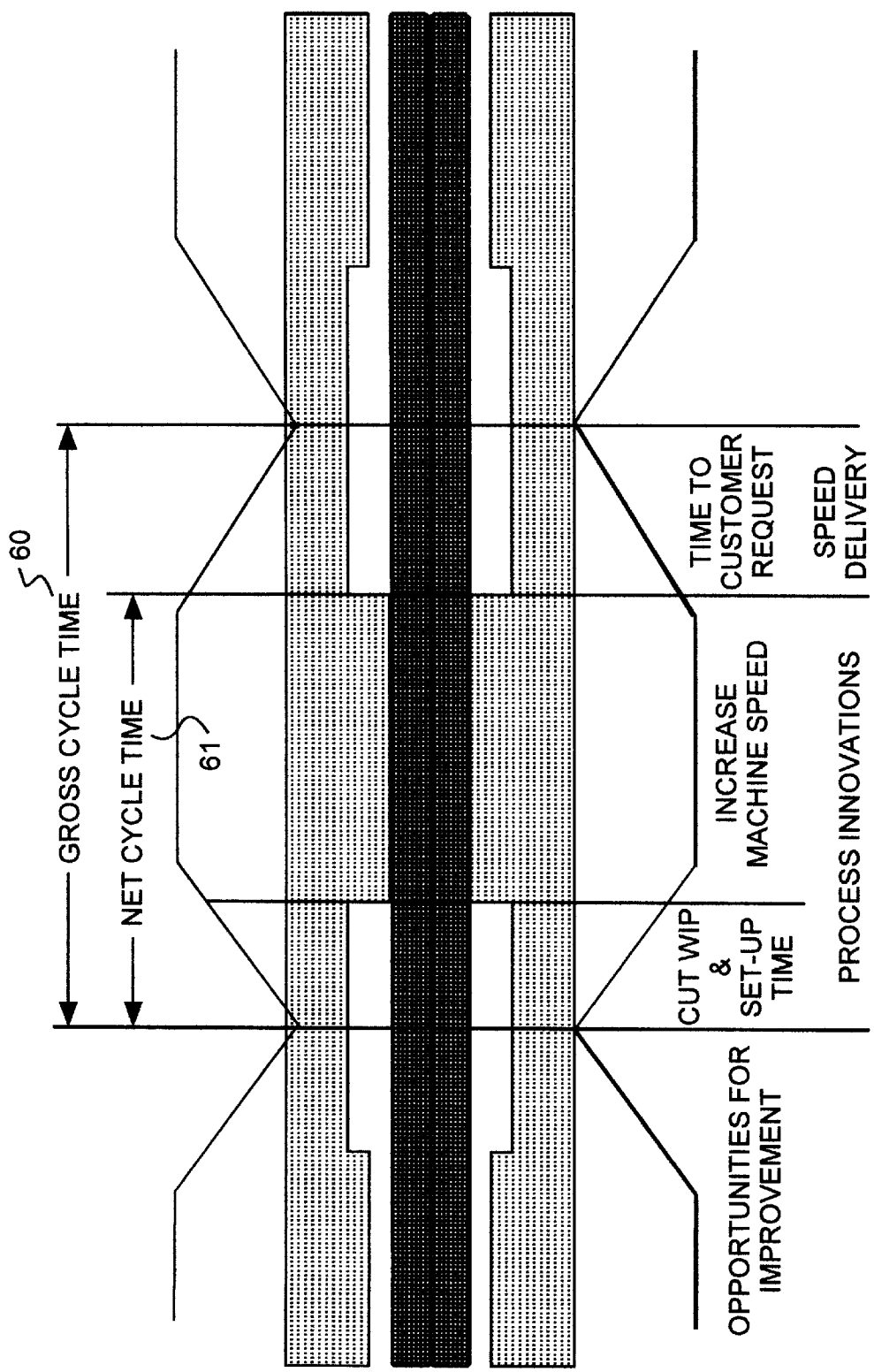
FIG. 5 illustrates work cell gross cycle time and net cycle time according to the present invention.

Because each work cell is responsible for inputting unit quantity and time information into a local processing device, as discussed above, central processing 10 is able to calculate cycle time information in each work cell. For example, gross cycle time 60, shown in FIG. 5, for a particular work cell and in particular workorder and lot, can be obtained. This information indicates how long a work cell was responsible for a workorder/lot. This includes set-up time, production run time and queuing time (wait time) for the next process step, if necessary. Equations 2 through 10 refer to cycle time information per lot of a given workorder. Gross cycle time 60 is defined as:

$$WWGCT = NATDw_j l_t c_y p_z - ATDw_j l_t c_y p_z \quad \text{(Equ. 2)}$$

where:

WWGCT is Work cell/Workorder/Lot Gross Cycle Time;

NATD is Next Accept Time/Date;

ATD is Accept Time Date;

$w_j$ is Workorder/Job Number;

$c_y$ is Team (for example, y=1 to 5);

$p_z$ is Process Step (for example, z=A to D); and $l_t$ is Lot or portion of a workorder With work cell gross cycle time calculated, workorder gross cycle time rate is calculated by:

$$WWGCTR = WWGCTw_j l_t c_y p_z / NAQw_j l_t c_y p_z \quad \text{(Equ. 3)}$$

where:

WWGCTR is Work cell/Workorder/Lot Gross Cycle Time Rate; and

NAQ is Next Accept Quantity.

Likewise, net cycle time 61 can be obtained. Net cycle time indicates how long a particular workorder, or a lot in a workorder, took to complete a process step, for example, the time period from accept and set-up 50 to completion run 41. Net cycle time is defined as:

$$WWNCT = CTDw_j l_t c_y p_z - ATDw_j l_t c_y p_z \quad \text{(Equ. 4)}$$

where:

WWNCT is Work cell/Workorder/Lot Net Cycle Time;

CTD is Complete Time/Date;

ATD is Accept Time/Date;

$w_j$ is Workorder/Job Number;

$l_t$ is Lot or portion of a workorder $c_y$ is Team (for example, y=1 to 5); and $p_z$ is Process Step (for example, z=A to E).

As with gross cycle time rate per work cell, net cycle time rate per work cell is defined as:

$$WWNCTR = WWNCTw_j l_t c_y p_z / NAQw_j l_t c_y p_z \quad \text{(Equ. 5)}$$

where:

WWNCTR is Work cell/Workorder/Lot Net Cycle Time Rate; and

NAQ is Next Accept Quantity.

Central processing 10 can also obtain cycle time information for a workorder or a lot in a workorder completing multiple process steps in a production line. This information measures the total elapsed time from beginning of set-up for the first process step to acceptance of the workorder/lot by finished goods inventory or by the end-use customer.

$$WGCT = NATDw_j l_t c_y p_5 - ATDw_j l_t c_y p_1 \quad \text{(Equ. 6)}$$

where:

WGCT is Workorder/Lot Gross Cycle Time; and the product required 5 process steps (A through E).

Likewise, net cycle time for a workorder or a lot in a workorder completing multiple process steps in a production line is defined as the sum of net cycle times for all work cells processing the workorder/lot:

$$WNCT = \Sigma CTDw_j l_t c_y p_z - ATDw_j l_t c_y p_z \text{(for example, z=1 to 5)} \quad \text{(Equ. 7)}$$

where:

WNCT is Workorder/Lot Net Cycle Time; and the product required 5 process steps (A through E).

Gross flow rate and net flow rate for a lot in a workorder are defined below.

$$WGFR = NAQw_j l_t / GCTw_j l_t \quad \text{(Equ. 8)}$$

$$WNFR = NAQw_j l_t / NCTw_j l_t \quad \text{(Equ. 9)}$$

where:

WGFR is Gross Flow Rate; and

WNFR is Net Flow Rate.

Gross flow rate and net flow rate for a work cell may be similarly calculated.

Finally, lot per workorder yield and flow efficiency are defined as:

$$WY = NAQwl_t / AQw_j l_t \quad \text{(Equ. 10)}$$

$$FE = WNCT / WGCT \quad \text{(Equ. 11)}$$

where:

WY is Yield; and

FE is Flow Efficiency.

Work cell yield and flow efficiency may also be calculated similarly.

By calculating the cycle time information above for each work cell and for all work cells in a production line which process a completed product, a large amount of cycle time information is obtained to identify opportunities for improving the manufacturing process. For example: 1) work in progress (WIP) may be cut; 2) set-up time for process machines can be reduced; 3) process or machine speed may be increased, if possible; 4) process innovations in a particular work cell may be more effectively evaluated; 5) quantities output from particular work cells may be timed to customer requests or next work cell requests and delivery speed to the next work cell can be increased.

Figure 6:
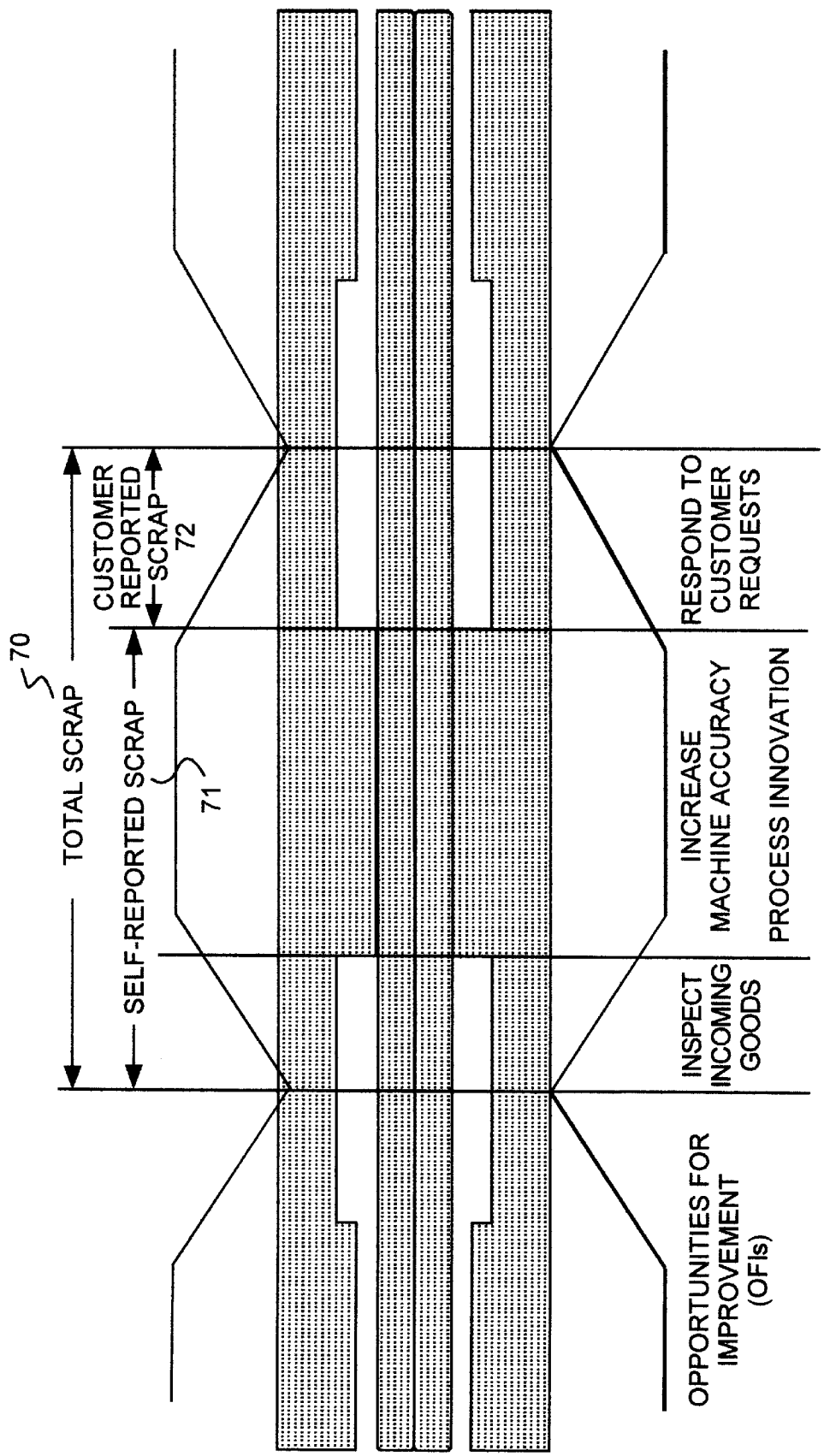
FIG. 6 illustrates work cell produced scrap according to the present invention.

Likewise, FIG. 6 illustrates how the present invention identifies scrap from a work cell. Identifying total scrap 70 in FIG. 6, which includes self-reported scrap 71 and customer-reported scrap 72, also creates opportunities for improvement in the manufacturing process. If individual work cells will be charged for their scrap units, workers will be more inclined to: 1) inspect incoming goods; 2) increase machine accuracy; 3) look to process innovations which reduce scrap; and 4) respond to customer requests in order to reduce customer-reported scrap 72.

Figure 7:
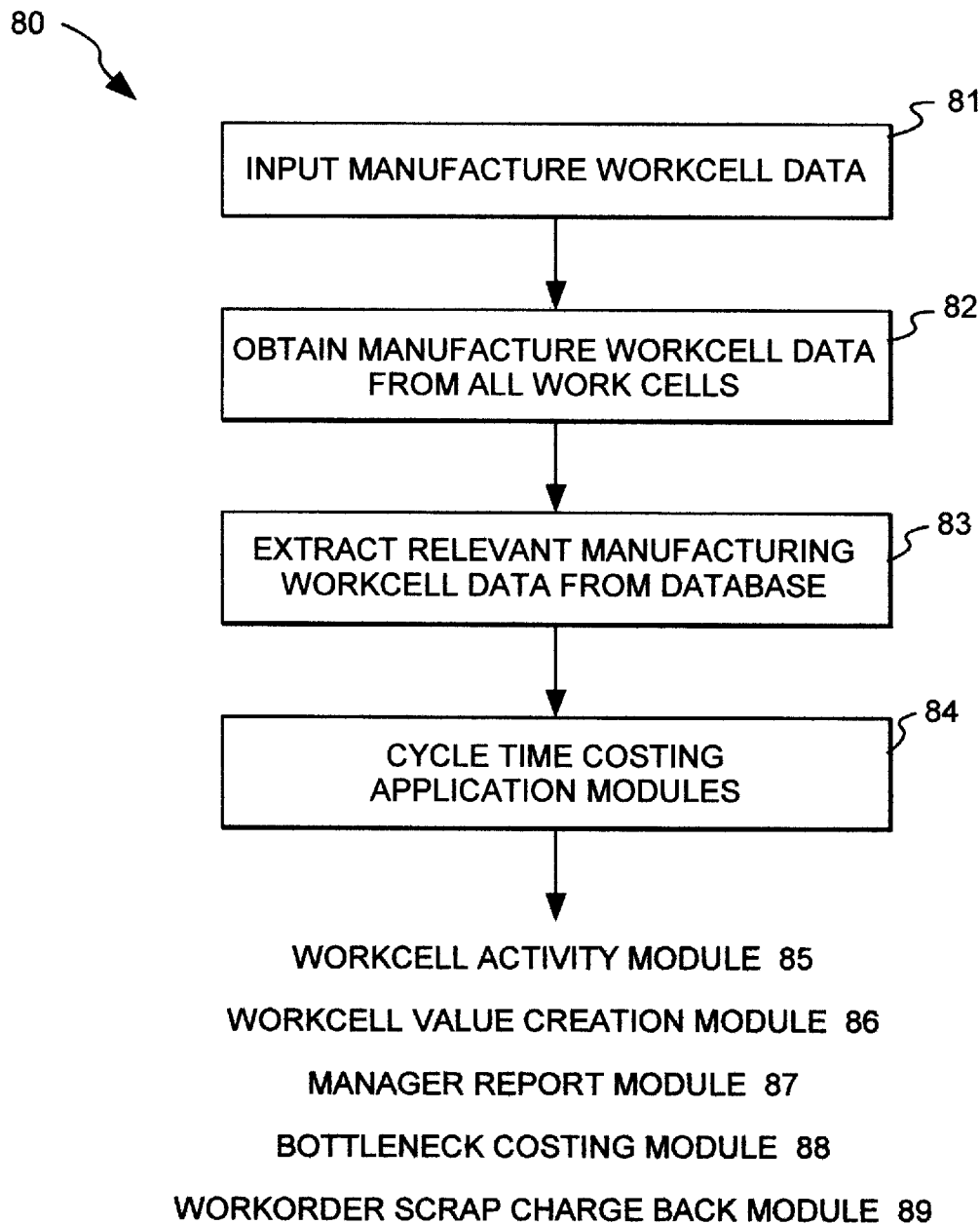
FIG. 7 illustrates the cycle time logic flow according to the present invention.

FIG. 7 illustrates logic flow 80 of the cycle time system 26 according to the present invention Quantity and time information are input at respective work cells in logic block 81. As described above, quantity and time information may be input by either a bar code scanner, keyboard, combination thereof, or other input device means. Cycle time system 26 then obtains work cell data from each work cell in the manufacturing facility in logic block 82. As described above, one embodiment obtains manufacturing work cell data in cycle time system 26 by using a MRP CHESS software package and an HP 9000 server coupled to a local area network. Relevant work cell data is then extracted from a database in logic block 83. In an embodiment, relevant work cell data is extracted using a CHESS data extract file of fixed width format. Finally, various cycle time application modules 84 then may be used in order to calculate the selected data. Cycle time application modules 84 include: 1) work cell activity module 85; 2) work cell value creation module 86; 3) manager report module 87; 4) bottleneck costing module 88; and 5) workorder scrap chargeback module 89. In an embodiment, the above modules are software application routines using Excel 5.0, supplied by Microsoft, located at Redmond, Wash., on a personal computer in central processing 10. The software application routines may also be stored on a computer readable medium, such as a magnetic disk. In alternate embodiments, cycle time applications could be designed in hardware using various hardware logic.

Figure 8:
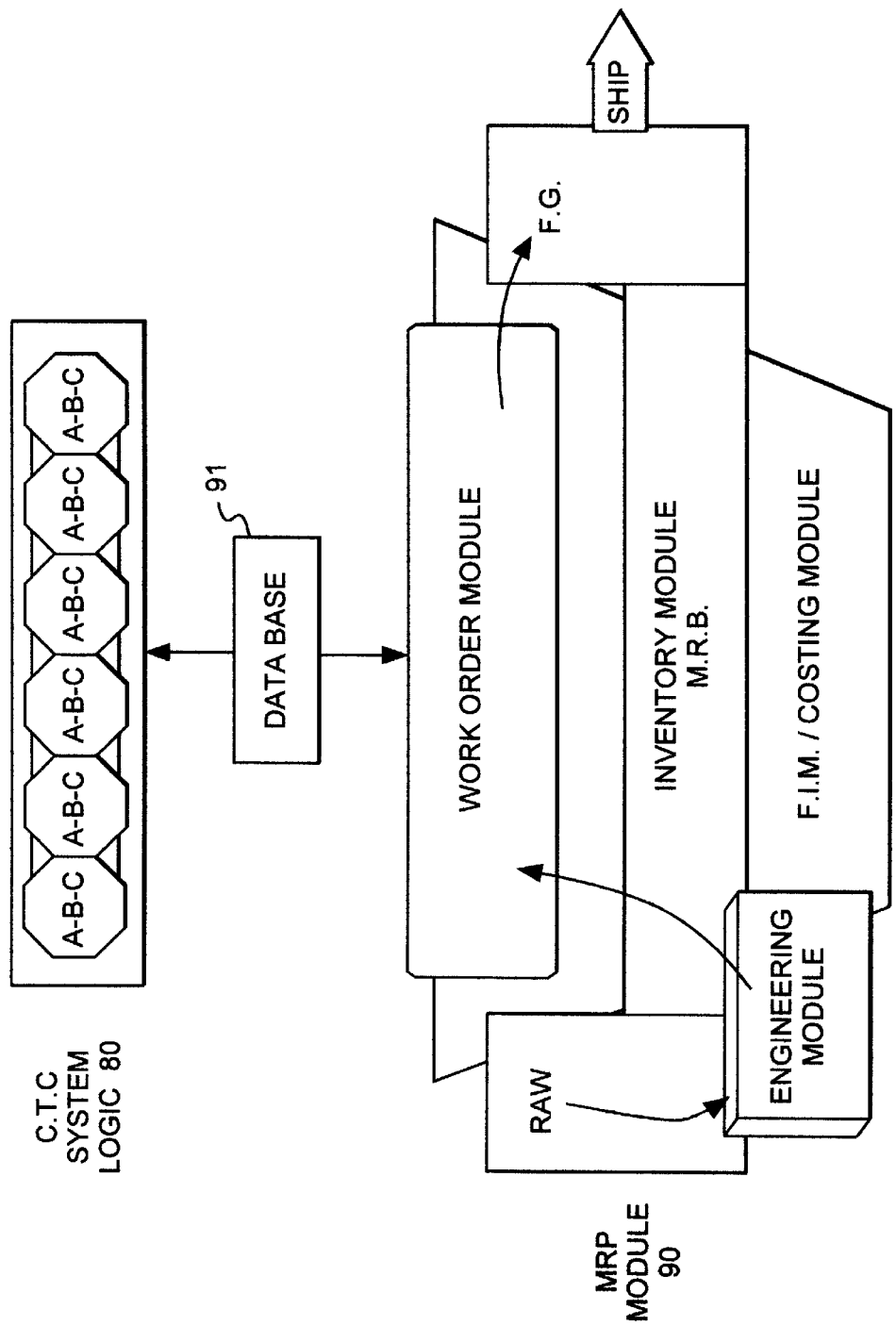
FIG. 8 illustrates the interface between the cycle time system and a manufacturing resource planning ("MRP") module according to the present invention.

FIG. 8 illustrates the interface between cycle time system logic 80 and an MRP module 90. In an embodiment, MRP module 90 is a Chess system which includes a workorder module, an inventory module, costing module and engineering module. The cycle time logic 80 obtains work cell data from a common database 91. In a preferred embodiment, the database is an Oracle database supplied by Oracle, located at Long Beach, Calif.

Figure 9:
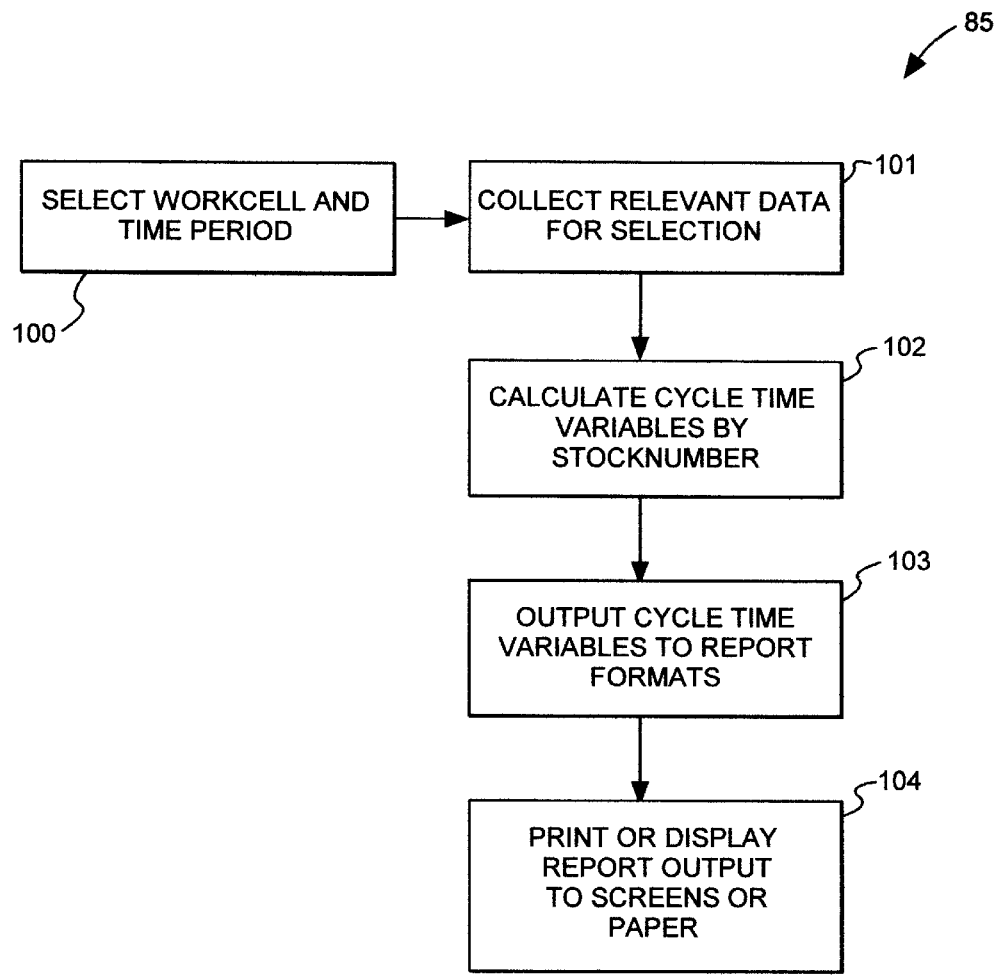
FIG. 9 illustrates a work cell activity module logic according to the present invention.

FIG. 9 illustrates the logic flow of the work cell activity module 85 illustrated in FIG. 7. Work cell activity module logic 85 identifies workorders completed by selected work cells during a selected time period. Logic block 100 selects a work cell and time period. Work cell data is then collected for the selected work cell and selected time period in logic block 101. Cycle time variables by stocknumber are calculated in logic block 101. Cycle time variables, which are calculated in logic block 102, include: 1) gross cycle time; 2) net cycle time; 3) net flow rate; 4) gross cycle time rate; 5) net cycle time rate; and 6) yield. Cycle time variables are then output to a report format in logic block 103. Finally, the report formats are either printed or displayed on a screen in logic block 104.

FIGS. 10 and 11 are example report formats. The report formats may be output at: 1) screen or printers at central processing 10; 2) local processing printers or screens 20 and 23 shown in FIG. 2; or 3) projected on large screens 22 or 25 in FIG. 2. Thus, work cells have immediate information as to cycle time variables in order to identify bottlenecks and improve efficiency. Likewise, managers at central processing 10 also have cycle time information.

FIG. 10 illustrates a report format output from work cell activity module 85 in FIG. 9. FIG. 10 illustrates a work cell yield report for a work cell completing a cut/tape process step. The team and shift is yellow and three, respectively. The time period selected is from Mar. 19, 1995 to Mar. 25, 1995. As can be seen, a list of stocknumbers associated with a given product is listed in a first column. Accepted and completed quantities for each stocknumber are listed in columns 3 and 4. Individual throughput rates and scrap rates associated with each product are also calculated and listed in columns 5 and 6. Finally, yields are listed in the final column.

For example, on the first line, 13.38K of stocknumber 50802 was accepted by the yellow team cut/tape work cell from Mar. 19, 1995 to Mar. 25, 1995. The cut/tape work cell then completed 13.25K units of stocknumber 50802 during the selected time period. The product had a throughput quantity of 13.25K and a scrap quantity of 0.13K. This resulted in 99% yield.

Similarly, FIG. 11 illustrates a work cell throughput report for the yellow team cut/tape work cell during shift 3 at the time period from Mar. 19, 1995 through Mar. 25, 1995. As in FIG. 10, individual stocknumbers are listed on the left-hand column with throughput quantity and yields for individual stocknumbers listed in columns 3 and 4. Average gross cycle time and average net cycle time per lot are also output in a days: hours: and minutes: format. Finally, net flow rate is likewise listed in the final column.

Figure 12:
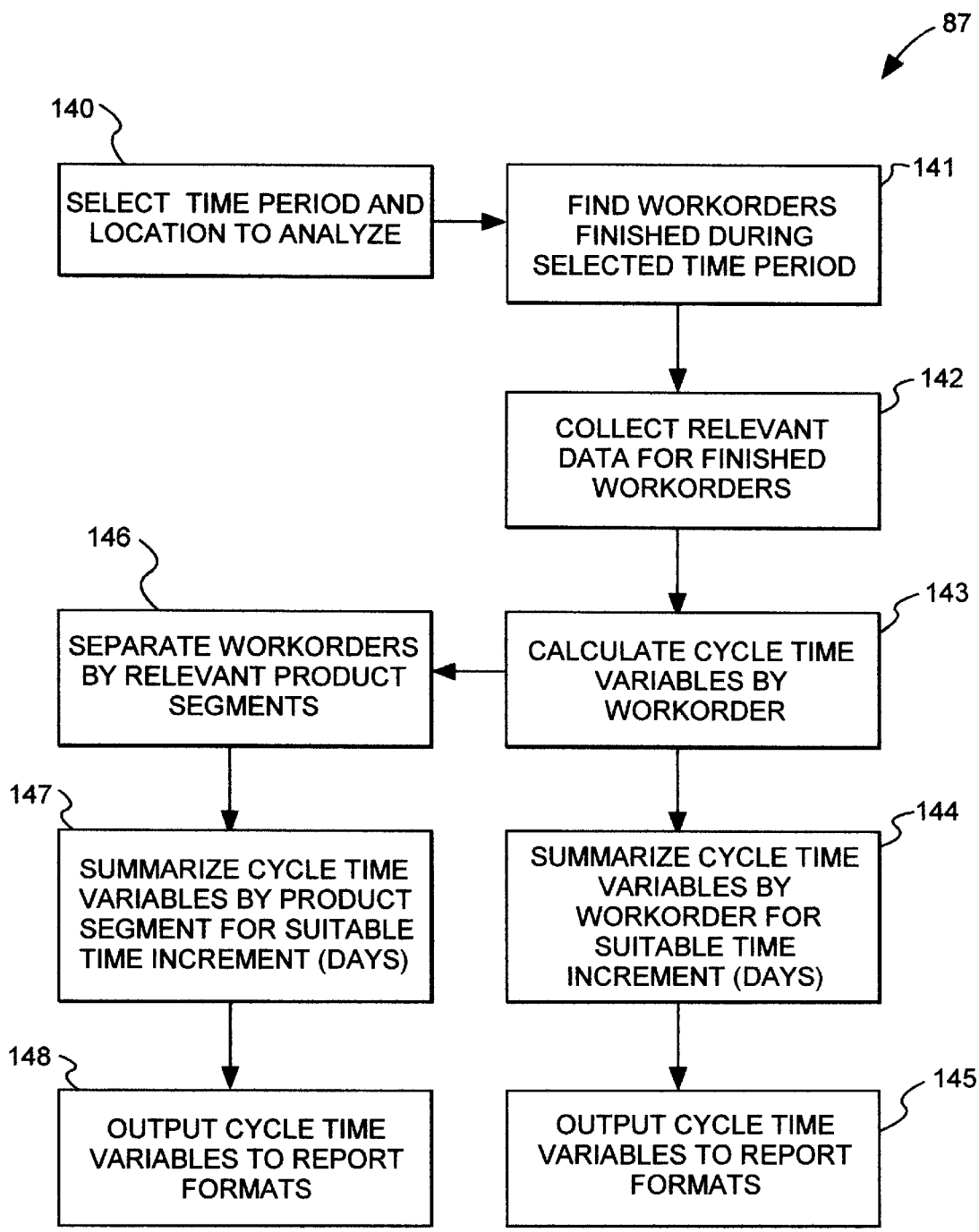
FIG. 12 illustrates a manager report module logic according to the present invention.

FIG. 12 illustrates manager report module logic 87 identified in FIG. 7. Logic block 140 selects the time period and manufacturing facility location to analyze. Logic block 141 then collects the workorders completed during the selected time period. Logic block 142 collects work cell data relevant to the completed workorders. Logic block 143 then calculates cycle time variables by workorder. The calculated cycle time variables in logic block 143 then may be summarized by workorders for suitable time increments in logic block 144 or separated by relevant product segments in logic block 146. The output from logic block 146 is input to logic block 147 which summarizes cycle time variables by product segment for a suitable time increment. Both outputs of logic blocks 147 and 144 are input to cycle time report formats in logic block 148 and logic block 145, respectively.

FIG. 13 illustrates a report format output from logic block 145 in FIG. 12. FIG. 13 illustrates a daily reel production summary for the selected period from Mar. 26, 1995 through Apr. 1, 1995. Among other cycle time variables, gross cycle time and net cycle time is displayed. Likewise, gross cycle time and net cycle time per reel are also summarized. Various cycle time variables are identified on a per-day basis from Mar. 26, 1995 through Apr. 1, 1995. For example, on Mar. 27, 1995, 10 reels were finished, producing 74K units. The gross cycle time and net cycle time was 46.62 hrs./K and 16.92 hrs./K, respectively. The yield was approximately 64%, with a flow efficiency of 36%. Net raw materials cost was $3,388 and scrap cost was $1,782, with a total cost of $5,170.

FIG. 14 also illustrates a cycle time workorder summary report output from work cell activity module logic 85. The workorder summary report identifies workorder 6211, and specifically lot 1 identified under the third ("Line") column. The workorder identifies stocknumber A58447 going through the dry etching, wet etching, plating, taping, cutting and sort/pack process steps in respective work cells. Employee names identifying accepting the various unit quantities into each work cell are also identified along with date and time information.

Figure 15:
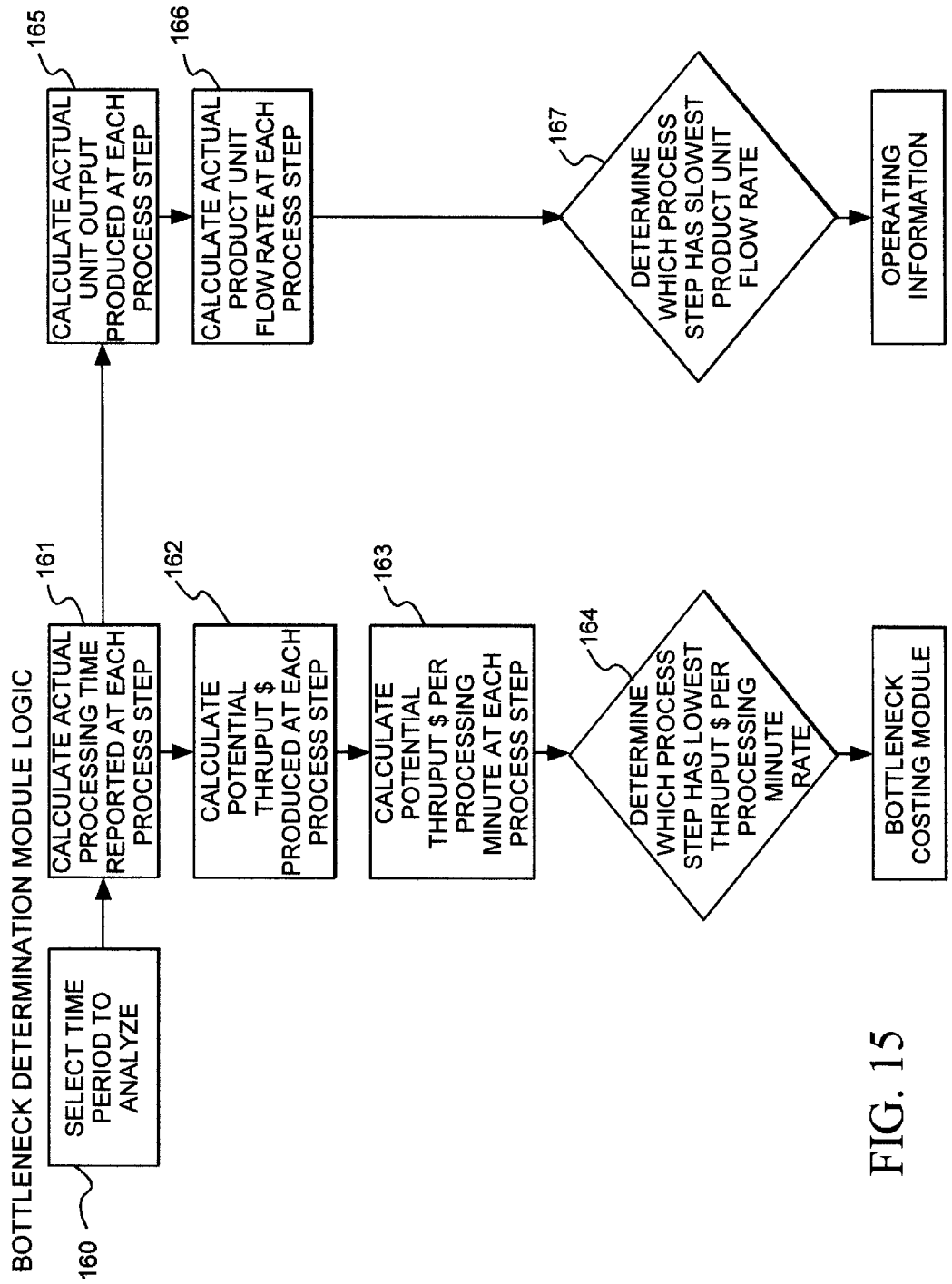
FIG. 15 illustrates a bottleneck determination module logic according to the present invention.

FIG. 15 illustrates a bottleneck costing module logic 88 identified in FIG. 7. There are two steps to bottleneck costing module logic 88: 1) Bottleneck Determination, and 2) Bottleneck Costing.

FIG. 15 illustrates the logic of the Bottleneck Determination Module. A time period is selected in logic block 160. The Workorder/Lot Processing Time for each workorder/lot in each process step is calculated and totalled to provide the Total Processing Time in each process step in logic block 161, as seen below in Equ. 12. Either Equ. 13 or Equ. 14 can be used to determine a specific Workorder/Lot Process Time at a particular process step.

In the preferred embodiment the Workorder/Lot Processing Time is calculated in Equ. 14, where the run time (Begin to Complete) is multiplied by the workcell/workorder/lot yield to provide a definition of processing time which excludes processing time on a product that was ultimately scrapped. Another definition of Workorder/Lot Processing Time (Equ. 15) could also be used. This definition is equivalent to the Workcell/Workorder/Lot Net Cycle Time in Equ. 4, above.

Total Processing Time at Process Step:

$$PTp_z = \Sigma WPTp_z \qquad \text{(Equ. 12)}$$

Workorder/Lot Processing Time:

$$WPTw_jl_t = (BTDw_jl_tc_yp_z - ATDw_jl_tc_yp_z) + ((CTDw_jl_tc_yp_z - BTDw_jl_tc_yp_z)*WWYp_z) \qquad \text{(Equ. 13)}$$

$$WPTw_jl_t = (BTDw_jl_tc_yp_z - ATDw_jl_tc_yp_z) + ((CTDw_jl_tc_yp_z - BTDw_jl_tc_yp_z)) \qquad \text{(Equ. 14)}$$

(Equ. 14 is equivalent to: $WWNCT = CTDw_jl_tc_yp_z - ATDw_jl_tc_yp_z$)

The Total thruput $ value produced for each stocknumber in each process step is calculated in logic block 162, as seen below in Equ. 15. The Total thruput $ value at a particular process step is equal to the sum of stocknumber thruput $ values for each stocknumber, multiplied by the number of completed goods or NAQ number.

Total Thruput $ Value at Process Step:

$$T\$p = \Sigma(ASPs - RMCs)*NAQs_xp_z \qquad \text{(Equ. 15)}$$

Stocknumber Thruput $ value is equal to the average selling price of a stocknumber $s_x$, minus raw material costs of the stocknumber, as described in Equ. 16.

Stocknumber Thruput $ Value:

$$T\$s_x = ASPs_x = RMCs_x \qquad \text{(Equ. 16)}$$

$ASPs_x$ is average selling price of stocknumber $s_x$.
$RMCs_x$ is raw material cost of stocknumber $s_x$ defined below in Equ. 24.

The average Thruput $ Rate per period of time for each process step is then obtained in logic block 163, as seen below in Equ. 17. In the preferred embodiment, the period of time is a minute. The process step with the lowest Thruput $ Rate ("BT$R"), or the factory's bottleneck process step, is determined in logic block 164, as seen below in Equ. 18.

Process Step Thruput $ Rate:

$$T\$Rp_z = T\$p_z/PTp_z \qquad \text{(Equ. 17)}$$

Bottleneck Thruput $ Rate:

$$BT\$R = \text{Minimum } T\$Rp_z \text{ (with 5 process steps: Z=1 to 5)} \qquad \text{(Equ. 18)}$$

In addition to determining a factory bottleneck based on thruput $ value described above, a factory bottleneck may be determined by the physical product flow rate, as shown in FIG. 15. First, the processing time for all workorders in each process step is calculated (logic block 161). Next, the output quantities for those workorders at each process step is determined (logic block 165). When the volume quantities for all stocknumbers and workorders processed is divided by the processing time for those same workorders, a product flow rate is determined for that process step (logic block 166). The product flow rates for each process step are compared in logic block 167. The lowest flow rate identifies the factory bottleneck based on physical product flow rates instead of on thruput $. This information can be used to identify product capacity constraints and product capacity utilization rates to assist operations management in improving factory thruput volume. When this data is restricted to a single machine or production line within a process step, it can be used to determine their capacity and utilization.

Figure 15A:
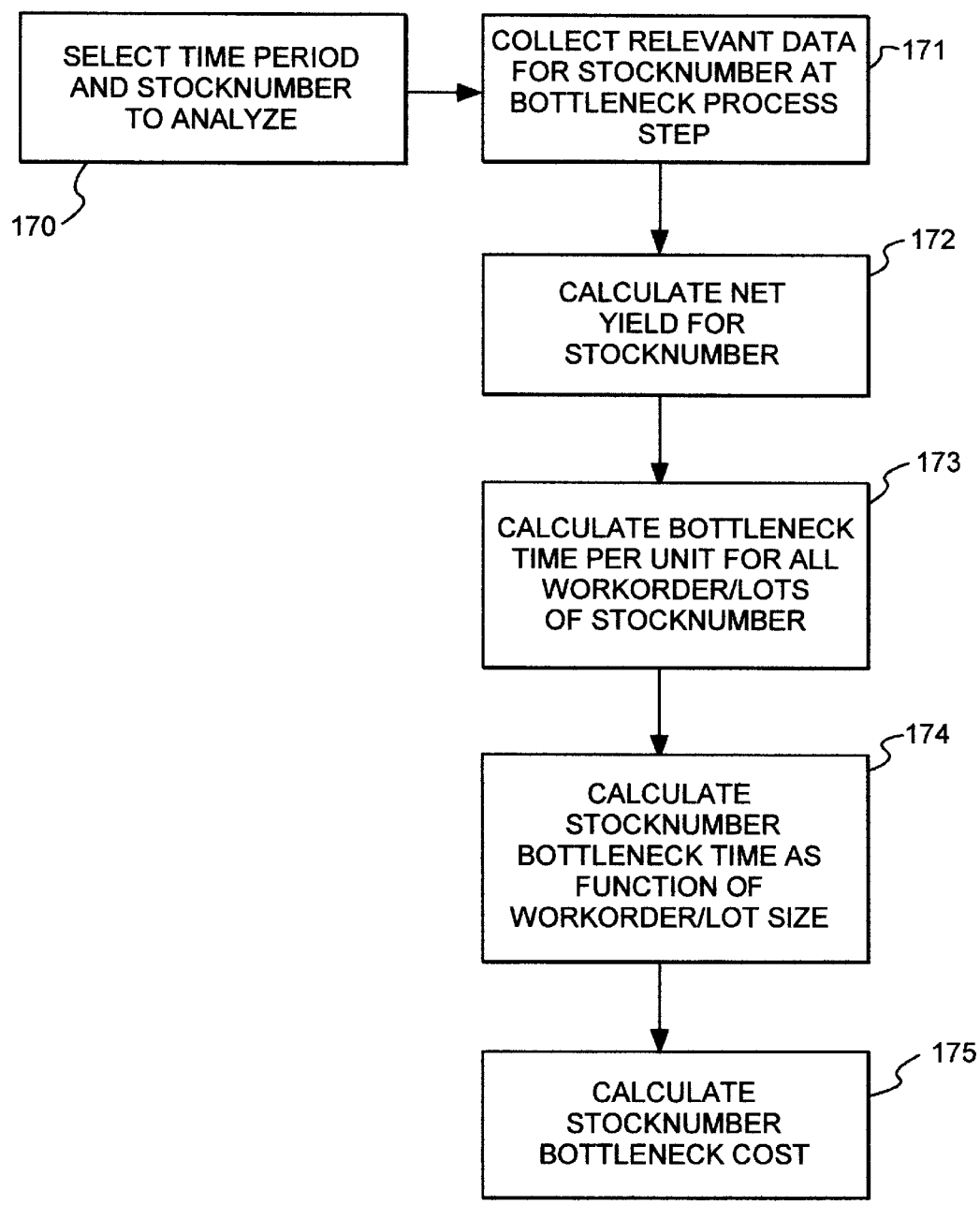
FIG. 15*a* illustrates a bottleneck costing module logic according to the present invention.

Product Flow Rate for a stocknumber at a process step:

$$FR = \Sigma NAQs_xp_z/\Sigma NCTs_xp_z \qquad \text{Equ. 18}a$$

where:
NAQ is the Next Accept Quantity; and
NCT is Net Cycle Time $(CTDs_xp_z - ATDs_xp_z)$ FIG. 15a illustrates the logic of the second step in bottleneck costing module logic 88. A time period and stocknumber is selected in logic block 170. Relevant data for the stocknumber in the time period at the determined factory bottleneck process step is collected in logic block 171. The Net Yield for a stocknumber is calculated in logic block 1 72, as seen in Equ. 19. The Net Yield is the total yield for all lots, workorders and process steps for a particular stocknumber.

Stocknumber Net Yield (with 5 process steps: z=1 to 5)

$$NYs_x = Ys_xp_1 * YSxP_2 * Ys_xp_3 * Ys_xp_4 * Ys_xp_5 \qquad \text{(Equ. 19)}$$

Next, the stocknumber workorder/lot bottleneck time per unit of output for each workorder/lot ("SWBTs$_x$") at the factory bottleneck process step is calculated in logic block 173, as seen in Equ. 20. The Workorder/Lot Process Time ("WPT") used in Equation 20 can be that defined by either Equation 13 or 14 when applied to the bottleneck process step.

Stocknumber Workorder/Lot Bottleneck Time $$SWBTs_x = WPTw_jl_tc_yp_{bottleneck}s_x/NAQw_jl_tc_yp_{bottleneck}s_x \qquad \text{(Equ. 20)}$$

Next, the relationship between the stocknumber workorder/lot bottleneck time ("SWBTs$_x$") and the workorder/lot unit output is determined in logic block 174 in order to obtain stocknumber bottleneck time, as illustrated by Equ. 21.

Stocknumber Bottleneck Time:

$$SBTs_x = SWBTs_x \text{ as function of } NAQis_x \qquad \text{(Equ. 21)}$$

(e.g.,: SBT is average of all SWBT, weighted average of all SWBT, or linear function F(NAQ)=SWBT)

The relationship between SWBTs$_x$ and SBTs$_x$ can be established in several different ways: 1) A simple average of the factory bottleneck times and units per reel for all workorders/lots of that stocknumber in the selected time period could be used. 2) A weighted average bottleneck time could be calculated based on the total time and total units for all workorders/lots of that stocknumber. 3) A linear regression technique could be used to calculate the relationship between bottleneck time and the units per reel of each workorder/lot of the stocknumber. The method used is dependent on the particular circumstances of the factory, the product and the manufacturing process.

With each of the three methods described above to determine the relationship between bottleneck time and units per reel, either of two methods for calculating the workorder/lot process times can be used. (See Equation 21) As described in the previous section on bottleneck determination, the processing time calculation can be made using either the full run time for each workorder/lot or only the productive portion of the run time (excluding the time used to process scrapped material) (Equations 13 or 14).

The preferred method for determining the relationship between SWBTs$_x$ and NAQs$_x$ uses the linear regression technique and the productive portion of run time definition for $WPT_{wilt}$ (Equ. 13).

In the linear regression technique, the number of minutes in the bottleneck process per unit of output is predicted. The relationship describes a linear function of the form y=mx+b, where y is the estimated bottleneck time, m is the slope of the estimated line, x is the units of output and b is the y intercept. The regression analysis establishes values for m and b. An appropriate value for the units per reel (x) is then chosen. And then using the linear formula the associated bottleneck time (y) for the stocknumber is computed. The choice of x, or units per reel, to use can be one of several types. The average or mean of all x's in the data set, the median, mode or a trimmed mean could all be used depending on the circumstances of the product and the process. In the preferred method, a trimmed mean, which excludes an equal portion of the highest and lowest data points, is used. By using this method, data outliers are eliminated. A relationship other than linear, for example, logarithmic or exponential, could also be used. Based on the relationship, the Stocknumber Bottleneck Cost, "$BCs_x$", as shown in Equ. 22, is calculated in logic block 175.

Stocknumber Bottleneck Cost $$BCs_x = SBTs_x * BTC \qquad \text{(Equ. 22)}$$

Accordingly, the Total Stocknumber Bottleneck Cost ("$TBCs_x$") is defined as the sum of the stocknumber bottleneck time cost ("$BCs_x$") and the stocknumber/lot raw material cost, as seen in Equ. 23 below.

Total Stocknumber Bottleneck Cost:

$$TBCs_x = BCs_x + RMCs_x \qquad \text{(Equ. 23)}$$

The stocknumber/lot raw material cost ("$RMCs_x$") is calculated using the unit raw material cost for the particular stocknumber ("$RMs_x$") and dividing by the average net yield of that stocknumber ("$NYs_x$") as in Equations 19 and 24.

Raw Material Cost:

$$RMCs_x = RMs_x / NYs_x \qquad \text{(Equ. 24)}$$

Figure 16:
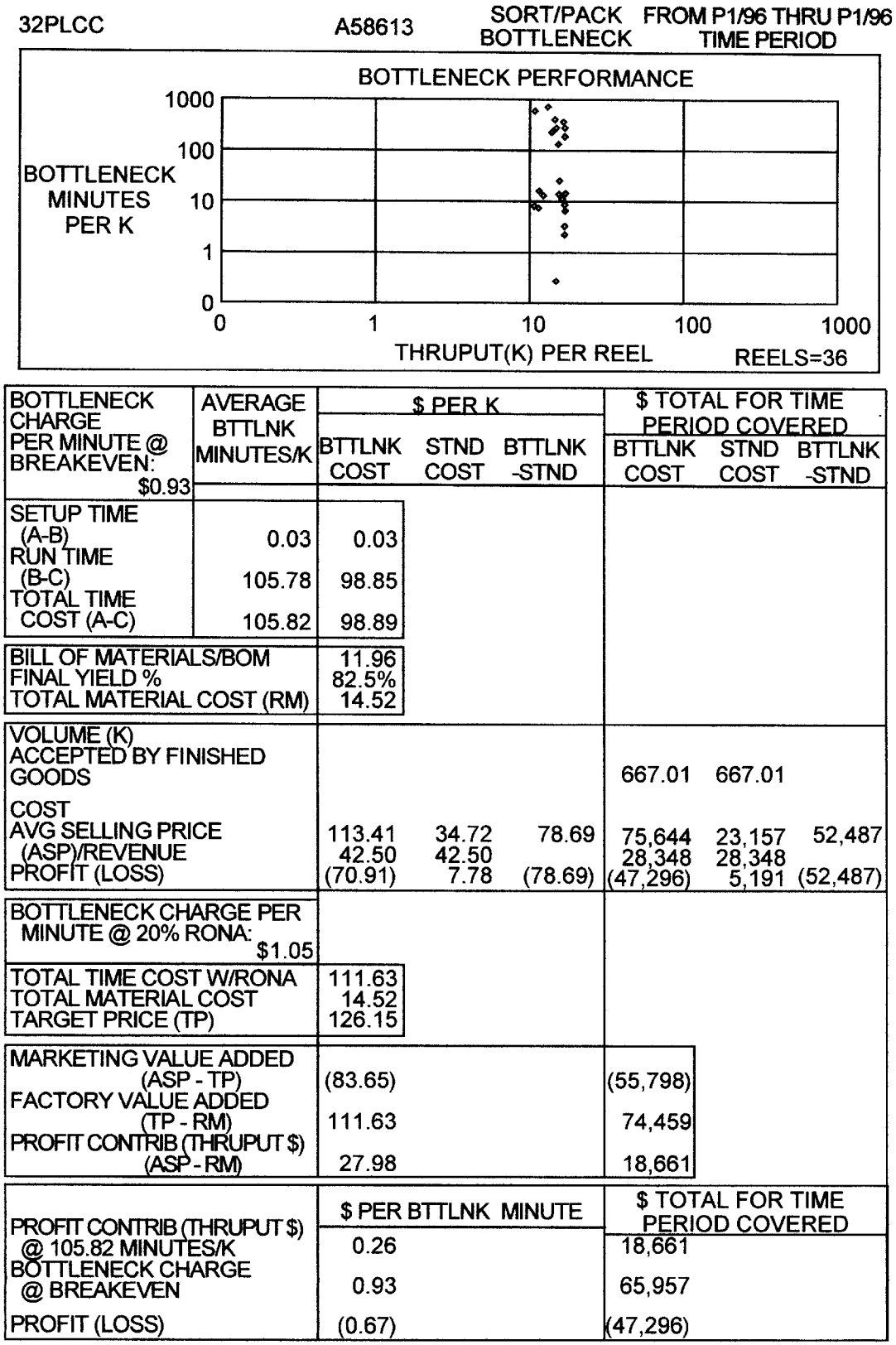
FIG. 16 illustrates a stocknumber bottleneck report output from the bottleneck costing module logic according to the present invention.

FIG. 16 illustrates a report format from logic block 175 containing bottleneck cost information. A one-month time period is selected. The report is divided into a graphical representation and chart form. In this example, a sort/pack process step has been determined to be the factory bottleneck. The graphical representation shows bottleneck processing minutes per thousand (K) of units in the sort/pack process step, versus thruput in thousands per reel. Thirty-six reels were processed in this time period. Averaging the bottleneck minutes per thousand results in a total time cost shown as 105.82 minutes/K. A bottleneck time charge ("BTC") is calculated as $0.93 for a break-even factory or a factory which does not generate a profit on net assets ("RONA").

Multiply the BTC ($0.93) by the stocknumber bottleneck time ("$SBTs_x$") (105.82 minutes) equals stocknumber bottleneck cost ("$BCs_x$") ($98.89). Adding the raw material cost ("RM") (14.52) equals a total cost of $113.41.

In contrast, standard costing techniques have determined the cost of producing a thousand units would be $34.72. Similarly, when these costs are multiplied by the volume (K) of finished goods accepted (667.01), a likewise disparity between standard costing and bottleneck costing is illustrated. Under standard costing techniques, the factory makes $5,191 during a month of production; while under bottleneck costing, the factory lost $47,296.

With a 20% RONA factored in, the BTC is $1.05, which translates to a $126.15 target price per thousand of units.

The chart also shows marketing value added, as well as factory value added as profit contribution values.

Figure 17:
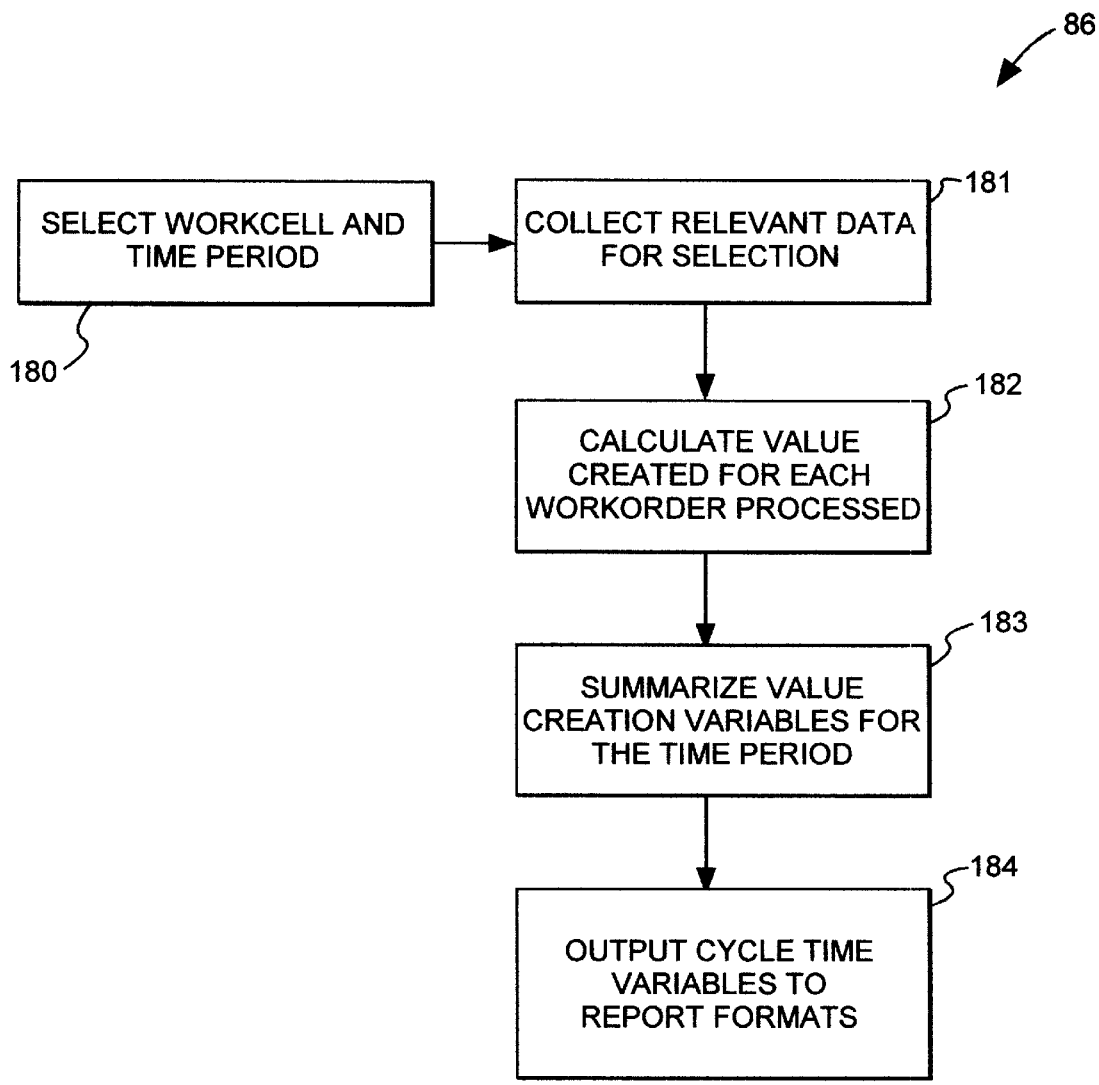
FIG. 17 illustrates a work cell value creation module logic according to the present invention.

FIG. 17 illustrates a work cell value creation module logic 86 identified in FIG. 7. The logic module determines how much value a particular work cell is generating. A work cell and time period is selected in logic block 180. Relevant work cell data for the selected time period and work cell is collected in logic block 181. Value created for each workorder is then calculated in logic block 182 and value creation variables are summarized for the selected time period in logic block 183. Finally, the cycle time variables are output in a report format in logic block 184. A value creation report format is illustrated in FIG. 18.

Work cell value created is determined by:

$$VC = WR * WAY * WFE * WLE \qquad \text{(Equ. 25)}$$

where:

VC is Value Created;

WR is Work Cell Revenue;

WAY is Work Cell Average Yield;

WFE is Work Cell Flow Efficiency; and

WLE is Work Cell Labor Efficiency.

Work Cell Revenue credits the work cell with the sales value of the good units the work cell produced during the time period selected. Work cell Revenue is defined as:

$$WR = \Sigma NAQw_j l_c c_y p_z * ASPs_x \qquad \text{(Equ. 26)}$$

Work Cell Average Yield measures the overall yield of the work cell for the period selected. Work Cell Average Yield is defined as:

$$WAY = \Sigma NAQw_j l_c c_y p_z / \Sigma AQw_j l_c c_y p_z \qquad \text{(Equ. 27)}$$

Work Cell Flow Efficiency credits the work cell for the efficient use of processing time. Work Cell Flow Efficiency is defined as:

$$WFE = \Sigma WWNCTw_j l_c c_y p_z / \Sigma WWGCTw_j l_c c_y p_z \qquad \text{(Equ. 28)}$$

Work Cell Flow Efficiency can also be an average weighted by stocknumber or workorder lot volume. Work Cell Labor Efficiency credits the work cell for the efficient use labor in the course of processing units. Work Cell Labor Efficiency is defined as:

$$WLE = \text{Budgeted Labor Cost} c_y p_y / \text{Actual Labor Cost} c_y p_z \qquad \text{(Equ. 29)}$$

By applying the three efficiency factors to the total sales value of the product, the value the work cell created can be determined. In using the efficiency factors (WAY, WFE and WLE), the work cell can directly see how to increase value. A work cell can compare its performance with that of other work cells. In addition, a weighting could be applied to the efficiency factors to adjust the relative values of the factors and their impact on value creation, or to provide further incentive to improve a particular efficiency.

Figure 19:
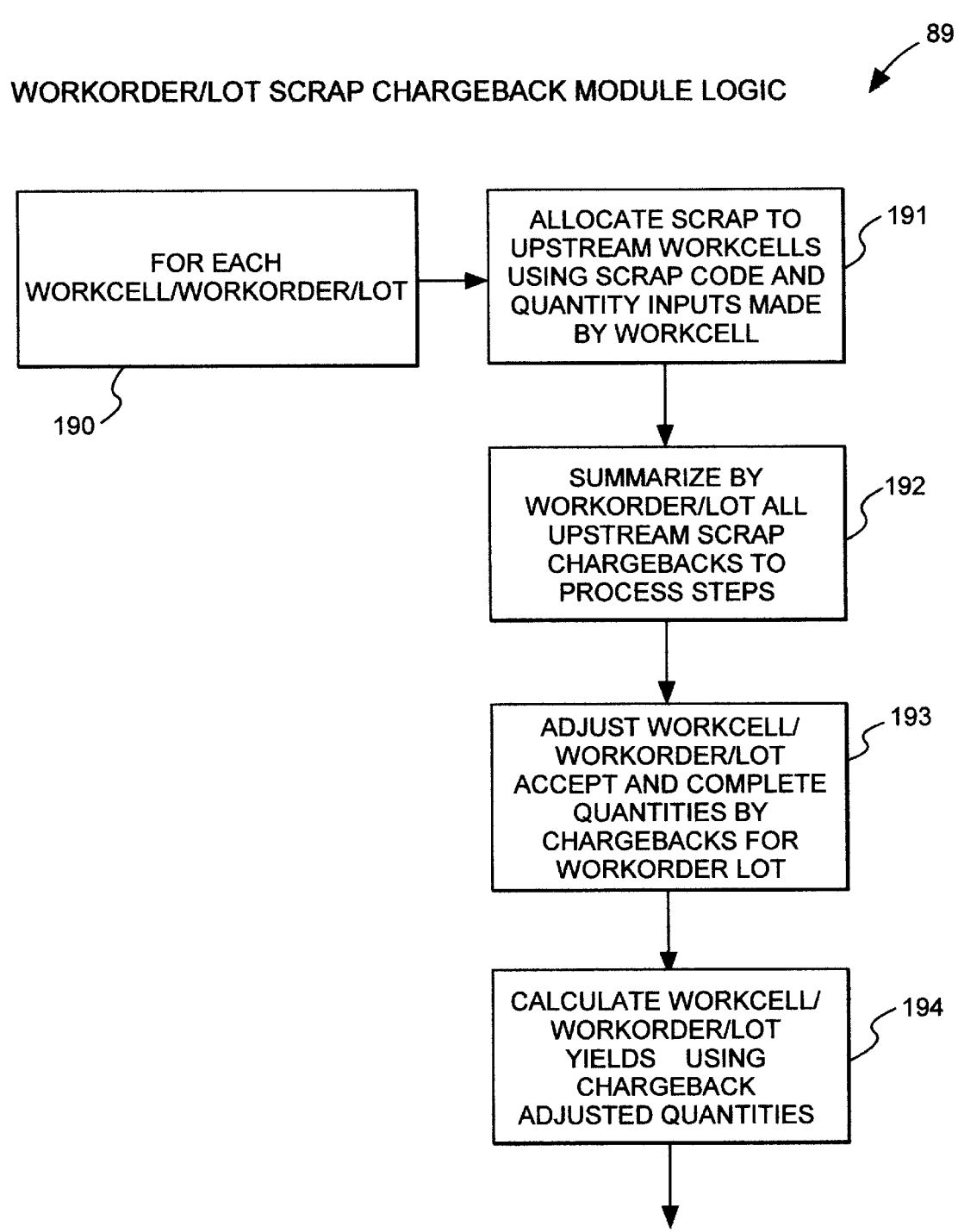
FIG. 19 illustrates a scrap chargeback module logic according to the present invention.

FIG. 19 illustrates a scrap chargeback module logic 89 identified in FIG. 7. Each work cell and workorder is identified in logic block 1 90. Work cells allocate scrap by using scrap codes and quantity inputs in logic block 191. Depending upon the scrap code and particular work cell reporting the scrap, yields are adjusted. For example, if process step D detects a plating error in a portion of a lot, a worker in a process step D work cell inputs the quantity of the scrap and a scrap code indicating a plating problem.

Central processing 10 will then charge customer reported scrap 72, as illustrated in FIG. 6, to the appropriate plating work cell. However, if process step D detects a stamping error in a portion of a lot, a different scrap code would be entered and a particular stamping process step work cell would be assigned a scrap chargeback by central processing 10. Thus, scrap chargebacks are determined by the reporting work cell and scrap code input used. Scrap chargebacks are summarized by process steps in logic block 192. Each work cell and workorder accept quantities AQ and complete quantities CQ are adjusted for chargebacks for a particular workorder in logic block 193. Work cell and workorders yields are then calculated using AQ and CQ quantities adjusted by chargebacks in logic block 194.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. For example, other embodiments which do not include a network or central processing device are possible. A user could input work cell quantity and time data into a processing apparatus, specifically an apparatus memory location, which calculates and outputs cycle time data. The output cycle time data could include factory bottleneck determination information, as well as bottleneck cost in a factory. The cycle time data may be output to a display screen, printer, or transferred by other communication media. It is intended that the scope of the invention be defined by the following claims and their equivalents.

What is claimed is:

1. A method for determining a bottleneck for a product in a manufacturing facility, comprising the steps of:
   obtaining time and quantity data from a manufacturing process step in the manufacturing facility;
   storing time and quantity data in a memory location of a computer;
   calculating a processing time of a manufacturing process step in response to the time data by the computer;
   calculating a total thruput value for the product at the manufacturing process step by the computer;
   calculating a thruput rate for the manufacturing process step in response to the thruput value and processing time by the computer; and
   selecting a minimum thruput rate corresponding to the bottleneck for the product.

2. The method of claim 1, wherein the total thruput value is calculated according to the equation:

$T\$p_z = \Sigma(ASPs_x - RMCs_x)*NAQs_xp_z$.

3. The method of claim 1, wherein the processing time is calculated according to the equation:

$WPTw_jl_t = (BTDw_jl_tc_yp_z - ATDw_jl_tc_yp_z) + ((CTDw_jl_tc_yp_z - BTDw_jl_tc_yp_z)*WWYp_z)$.

4. The method of claim 1, wherein the processing time is calculated according to the equation:

$WPTw_jl_t = (BTDw_jl_tc_yp_z - ATDw_jl_tc_yp_z) + ((CTDw_jl_tc_yp_z - BTDw_jl_tc_yp_z))$.

5. The method of claim 3 or 4, wherein the processing time is calculated by the equation:

$PTp_z = \Sigma WPTp_z$.

6. The method of claim 5, wherein the thruput rate is calculated according to the equation:

$T\$Rp_z = T\$p_z / PTp$.

7. A method for obtaining bottleneck cost information for a product in a manufacturing facility having a bottleneck process step, comprising the steps of:
   obtaining time and quantity data from a plurality of respective manufacturing process steps in the manufacturing facility;
   calculating a bottleneck processing time, responsive to a completed product of the bottleneck process step, by a computer;
   obtaining a bottleneck time charge; and
   obtaining a bottleneck cost of the product responsive to the bottleneck processing time and the bottleneck time charge.

8. The method of claim 7, wherein the method further includes:
   calculating a total product yield;
   calculating a raw material cost responsive to the total product yield; and
   obtaining a total product bottleneck cost responsive to the bottleneck cost and raw material cost.

9. The method of claim 8, wherein the total product yield is calculated according to the equation:

$NYs_x = Ys_xp_1 * Ys_xp_2 * Ys_xp_3 * Ys_xp_4 * Ys_xp_5$.

10. The method of claim 9, wherein the raw material cost is calculated according to the equation:

$RMCs_x = RMs_x / NYs_x$.

11. The method of claim 7, wherein the bottleneck time charge is calculated according to the equation:

$BTC = \text{Operating Expenses} / \text{Bottleneck Processing Time}$.

12. The method of claim 11, wherein the bottleneck processing time is calculated according to the equation:

$SBTs_x = SWBTs_x$ as a function of $NAQs_x$.

13. The method of claim 12, wherein the bottleneck cost of the product is calculated according to the equation:

$BCs_x = SBTs_x * BTC$.

14. A method for obtaining a bottleneck cost of a product in a manufacturing facility having a plurality of manufacturing process steps, comprising the steps of:
    obtaining time and quantity data, associated with a plurality of units to be processed by the manufacturing facility, from each manufacturing process step;
    storing the time and quantity data from the plurality of respective manufacturing process steps in a memory location of a computer;
    calculating a processing time corresponding to each process step responsive to the time data by the computer;
    calculating a total thruput value for a product at each process step by the computer;

calculating a thruput rate for each process step in response to the total thruput value and the processing time of the respective plurality of process steps by the computer;

selecting a minimizing thruput rate corresponding to the factory bottleneck process step;

calculating a bottleneck processing time responsive to completed products at the bottleneck process step by the computer;

obtaining a bottleneck time charge; and obtaining a bottleneck cost of the product responsive to the bottleneck processing time and bottleneck time charge.

15. The method of claim 14, wherein the processing time is calculated according to the equation:

$$WPTw_jl_t=(BTDw_jl_tc_yp_z-ATDw_jl_tc_yp_z)+((CTDw_jl_tc_yp_z-BTDw_jl_tc_yp_z)*WWYp_z).$$

16. The method of claim 14, wherein the processing time is calculated according to the equation:

$$WPTw_jl_t=(BTDw_jl_tc_yp_z-ATDw_jl_tc_yp_z)+((CTDw_jl_tc_yp_z-BTDw_jl_tc_yp_z).$$

17. The method of claim 14, wherein the total thruput value is calculated according to the equation:

$$T\$p_z=\Sigma(ASPs_x-RMCs_x)*NAQs_xp_z.$$

18. The method of claim 14, wherein the bottleneck time charge is calculated according to the equation:

BTC=Operating Expenses/Bottleneck Processing Time.

19. The method of claim 14, wherein the bottleneck processing time is calculated according to the equation:

$$SWBTs_x=WPTw_jl_tc_yp_{bottleneck}s_x/NAQw_jl_tc_{ybottleneck}s_x.$$

20. The method of claim 14, wherein the bottleneck cost of the product is calculated according to the equation:

$$BCs_x=SBTs_x*BTC.$$

21. An article of manufacture including a computer readable medium having computer readable program code means embodied therein for determining a bottleneck for a product in a manufacturing facility, the computer readable program code means in the article of manufacture comprising:

computer readable program code means for causing a computer to calculate a processing time responsive to time and quantity data acquired at a process step;

computer readable program code means for causing a computer to calculate a total thruput value for the product at the process step;

computer readable program code means for causing a computer to calculate a thruput rate responsive to the total thruput value and the processing time; and computer readable program code means for causing a computer to select a minimum thruput rate corresponding to the bottleneck.

22. The article of manufacture of claim 21, wherein the computer readable program code means for causing a computer to calculate processing time calculates processing time according to the equation:

$$WPTw_jl_t=(BTDw_jl_tc_yp_{z-ATD}w_jl_tc_yp_z)+((CTDw_jl_tc_yp_z-BTDw_jl_tc_yp_z)*WWYp_z).$$

23. The article of manufacture of claim 21, wherein the computer readable program code means for causing a computer to calculate processing time calculates processing time according to the equation:

$$WPTw_jl_t=(BTDw_jl_tc_yp_z-ATDw_jl_tc_yp_z)+(CTDw_jl_tc_yp_z-BTDw_jl_tc_yp_z).$$

24. The article of manufacture of claim 21, wherein the computer readable program code means for causing a computer to calculate a thruput value calculates the thruput value according to the equation:

$$T\$p_z=\Sigma(ASPs_x-RMCs_x)*NAQs_xp_z.$$

25. The article of manufacture of claim 21, wherein the computer readable program code means for causing a computer to calculate a thruput rate calculating the thruput rate according to the equation:

$$T\$Rp_z=T\$p_z/PTp_z.$$

26. The article of manufacture of claim 21, further comprising:

a computer readable program and means for causing a computer to display a name of the location of the bottleneck.

27. An article of manufacture including a computer readable medium having computer readable program means embodied therein for obtaining bottleneck cost information for a product in a manufacturing facility having a bottleneck process step, the computer readable means in the article of manufacture comprising:

computer readable program code means for causing a computer to calculate a bottleneck processing time responsive to a completed product of the bottleneck process step;

computer readable program code means for causing a computer to obtain a bottleneck time charge; and computer readable program code means for causing a computer to obtain a bottleneck cost of the product responsive to the bottleneck processing time and the bottleneck time charge.

28. The article of manufacture of claim 27, wherein the article of manufacture further includes:

a computer readable program code means for causing a computer to calculate a total product yield;

computer readable program code means for causing a computer to calculate a raw materials cost responsive to the total product yield; and computer readable program code means for causing a computer to obtain a total product bottleneck cost responsive to the bottleneck cost and the raw material cost.

29. The article of manufacture of claim 28, wherein the computer readable program code means for causing a computer to calculate the bottleneck time charge calculates bottleneck time charge according to the equation:

BTC=Operating Expenses/Bottleneck Processing Time.

30. The article of manufacture of claim 28, wherein the computer readable program code means for causing a computer to calculate bottleneck processing time calculates bottleneck processing time according to the equation:

$$SBTs_x=SWBTs_x \text{ as a function of } NAQs_x.$$

31. The article of manufacture of claim 28, wherein the computer readable program code means for causing a computer to calculate bottleneck cost calculates bottleneck cost according to the equation:

$$BCs_x = SBTs_x * BTC.$$

32. The article of manufacture of claim 28, wherein the computer readable program code means for causing a computer to calculate the total product yield calculates the total product yield according to the equation:

$$NYs_x = Ys_x p_1 * Ys_x p_2 * Ys_x p_3 * Ys_x p_4 * Ys_x p_5.$$

33. The article of manufacture of claim 32, wherein the computer readable program code means for causing a computer to calculate the raw material cost calculates the raw material cost according to the equation:

$$RMCs_x = RMs_x / NYs_x.$$

34. A method for estimating a delivery time of a quantity of units produced at a manufacturing facility, comprising the steps of:

inputting, into an input device at a first manufacturing process step, a first accept time value and a first complete time value associated with a first quantity of units to be processed at the first manufacturing process step;

inputting, into a second input device at a second manufacturing process step, a second accept time value and a second complete time value associated with a second quantity of units to be processed at the second manufacturing process step;

calculating, by a processing device, a first processing time value associated with the first manufacturing process step and a second processing time value associated with the second manufacturing process step; and determining an estimated delivery time for a third quantity of units processed by the first and second manufacturing process steps to a customer based on the first and second processing time values.

35. A method for improving the efficiency of a manufacturing facility having a plurality of manufacturing process steps, wherein each manufacturing process step includes a manufacturing machine, comprising the steps of:

inputting, into a first input device at a first manufacturing process step in the plurality of manufacturing process steps, a first accept time value, a first begin time value, a first complete time value, and a first accept quantity value associated with a first quantity of units to be processed at the first manufacturing process step;

inputting, into a second input device at a second manufacturing process step in the plurality of manufacturing process steps, a second accept time value, a second begin time value, a second complete time value, and a second accept quantity value associated with a second quantity of units to be processed at the second manufacturing process step;

inputting, into an input device at a third manufacturing process step in the plurality of manufacturing process steps, a third accept time value, a third begin time value, a third complete time value, and a third accept quantity value associated with a third quantity of units to be processed at the third manufacturing process step;

calculating, by a processing device, a first, a second, and a third processing time values for the first, second, and third manufacturing process steps, respectively;

calculating, by the processing device, a first, a second, and a third thruput values for the first, second, and third manufacturing process steps, respectively, based on an average selling price of the product, raw material cost, and the first, second, and third accept quantity values;

calculating, by a processing device, a first, a second, and a third thruput rate values for the first, second, and third manufacturing process steps, respectively, based on the first, second, and third thruput values and the first, second, and third process time values;

comparing the first, second, and third thruput rate values of the manufacturing process steps to obtain a lowest thruput rate value; and increasing the machine speed in the manufacturing process step associated with the lowest thruput rate value.

36. A method for determining a price of a product produced at a manufacturing facility having a plurality of manufacturing process steps, comprising the steps of:

inputting, into a first input device at a first manufacturing process step in the plurality of manufacturing process steps, a first time value and a second time value associated with a first quantity of units to be processed at the first manufacturing process step;

inputting, into a second input device at a second manufacturing process step in the plurality of manufacturing process steps, a third time value and fourth time value associated with a second quantity of units to be processed at the second manufacturing process step;

subtracting, by the processing device, the first time value from the second time value to obtain a first net cycle time;

subtracting, by the processing device, the third time value from the fourth time value to obtain a second net cycle time;

dividing, by the processing device, the first net cycle time by the first quantity to obtain a first net flow rate;

dividing, by the processing device, the second net cycle time by the second quantity to obtain a second net flow rate;

comparing the first and second net flow rates to obtain a lowest net flow rate;

obtaining a product's bottleneck cycle time cost associated with a manufacturing process step having the lowest net flow rate by multiplying the lowest net flow rate associated with the lowest net flow rate by a cycle time charge and by the third quantity;

obtaining a total bottleneck cost by summing the product's bottleneck cycle time cost and a product's raw materials cost; and selecting a price for the product based on the total bottleneck cost.

37. A semiconductor manufacturing facility, comprising:

a production line, including a plurality of semiconductor manufacturing process steps, for manufacturing a plurality of units;

a first semiconductor manufacturing process step, in the plurality of semiconductor manufacturing process steps, for providing a dry etch process step of the plurality of units;

a first bar code scanner for inputting a first accept time, a first begin time, a first complete time, a first accept quantity of units, and a first complete quantity of units associated with the first semiconductor manufacturing process step;

a second semiconductor manufacturing processing step, in the plurality of semiconductor manufacturing processing steps, for providing a wet etch process in the plurality of units;

a second bar code scanner for inputting a second accept time, a second begin time, a first complete time, a second accept quantity of units, and a second complete quantity of units associated with the second semiconductor manufacturing process step; and a computer, coupled to the first bar code scanner and the second bar code scanner, for 1) obtaining a first thruput rate value for the first semiconductor manufacturing process step and a second thruput rate value for the second semiconductor manufacturing process step, and 2) identifying whether the first or second manufacturing process step is the bottleneck.

38. An apparatus for identifying a manufacturing process step in a production line of a manufacturing facility which limits the capability of the manufacturing facility to produce a product, the apparatus comprising:

a first bar code scanner at a first manufacturing process step in the production line, for inputting a first accept time, a first begin time, a first complete time, a first accept quantity of units, and a first complete quantity of units;

a first computer, coupled to the first bar code scanner, for storing a first accept time, a first begin time, a first complete time, a first accept quantity of units, and a first complete quantity of units;

a second bar code scanner at a second manufacturing process step in the production line, for inputting a second accept time, a second begin time, a second complete time, a second accept quantity of units, and a second complete quantity of units;

a second computer, coupled to the second bar code scanner, for storing the second accept time, a second begin time, a second complete time, a second accept quantity of units, and a second complete quantity of units; and a central computer, coupled to the first and second computers, for calculating 1) a first and second processing time values associated with the first and second manufacturing process step responsive to the first and second accept times and the first and second complete times, 2), a thruput value responsive to the product average selling price, raw material cost, and first and second complete quantity of units, and 3) calculating a thruput rate for the first and second semiconductor manufacturing process steps responsive to the first and second processing times and first and second thruput values.

* * * * *

UNITED STATES PATENT AND TRADEMARK OFFICE
CERTIFICATE OF CORRECTION

PATENT NO. : 5,946,661  
DATED : August 31, 1999  
INVENTOR(S) : Rothschild et al.

Page 1 of 1

It is certified that error appears in the above-identified patent and that said Letters Patent is hereby corrected as shown below:

Column 10,  
Line 22, Equation 9, please delete "$WNFR = NAQw_k l_t / NCTw_j l_t$" and insert -- $WNFR = NAQw_j l_t / NCTw_j l_t$ -- therefor.

Column 19, claim 19,  
Line 37, please delete $SWBTs_x = WPTw_j l_t c_y p_{bottleneck} s_x / NAQw_j l_t c_{ybottleneck} s_x$" and insert -- $SWBTs_x = WPTw_j l_t c_y p_{bottleneck} s_x / NAQw_j l_t c_y p_{bottleneck} s_x$ -- therefor.

Signed and Sealed this

Twelfth Day of February, 2002

Attest:

JAMES E. ROGAN  
Attesting Officer — Director of the United States Patent and Trademark Office